United States Patent
Ooya et al.

(10) Patent No.: US 8,970,971 B2
(45) Date of Patent: Mar. 3, 2015

(54) LENS BARREL

(75) Inventors: Takahiro Ooya, Yokohama (JP); Katsunobu Yoshida, Sagamihara (JP)

(73) Assignee: Ricoh Company, Ltd., Tokyo (JP)

( * ) Notice: Subject to any disclaimer, the term of this patent is extended or adjusted under 35 U.S.C. 154(b) by 38 days.

(21) Appl. No.: 13/170,523

(22) Filed: Jun. 28, 2011

(65) Prior Publication Data

US 2012/0002307 A1    Jan. 5, 2012

(30) Foreign Application Priority Data

Jun. 30, 2010    (JP) ................................. 2010-148823

(51) Int. Cl.
| | |
|---|---|
| *G02B 15/14* | (2006.01) |
| *G02B 7/02* | (2006.01) |
| *G02B 7/10* | (2006.01) |
| *H04N 5/225* | (2006.01) |

(52) U.S. Cl.
CPC .............. *G02B 7/102* (2013.01); *H04N 5/2251* (2013.01)
USPC .......................................... 359/817; 359/704

(58) Field of Classification Search
USPC ......... 359/811, 815, 819–824, 555–557, 696, 359/700, 704, 817; 396/76, 79, 85
See application file for complete search history.

(56) References Cited

U.S. PATENT DOCUMENTS

| | | | |
|---|---|---|---|
| 5,495,309 A * | 2/1996 | Shiina et al. ..................... | 396/86 |
| 6,978,089 B2 | 12/2005 | Nomura et al. | |
| 7,013,081 B2 | 3/2006 | Nomura et al. | |
| 7,551,376 B2 * | 6/2009 | Koyama ......................... | 359/823 |
| 7,580,623 B2 | 8/2009 | Nuno et al. | |
| 7,872,683 B2 | 1/2011 | Iwasaki | |
| 2007/0019938 A1 | 1/2007 | Nomura | |
| 2007/0035857 A1 | 2/2007 | Irisawa | |
| 2008/0117527 A1 | 5/2008 | Nuno et al. | |
| 2011/0273786 A1 | 11/2011 | Ooya | |

FOREIGN PATENT DOCUMENTS

| | | |
|---|---|---|
| CN | 1658003 A | 8/2005 |
| CN | 101027604 A | 8/2007 |
| CN | 101078858 A | 11/2007 |

(Continued)

*Primary Examiner* — Stephone B Allen
*Assistant Examiner* — Brandi Thomas
(74) *Attorney, Agent, or Firm* — Dickstein Shapiro LLP

(57) ABSTRACT

A lens barrel includes a plurality of lens groups including a retractable lens group, a plurality of lens retaining frames to retain the plurality of lens groups, a movable lens barrel to retain the plurality of lens retaining frames therein, and a fixed cylinder portion to retain the movable lens barrel therein. The plurality of lens retaining frames, the movable lens barrel and the fixed cylinder portion are configured to move the plurality of lens groups between a collapsed state with at least one portion of the plurality of lens groups collapsed and a photographing state. The plurality of lens retaining frames include a retractable lens retaining frame configured to movably retain the retractable lens group so as to position the plurality of lens groups in photographing positions on a single optical axis in the photographing state and to retract the retractable lens group to a retracted position outside an inside diameter position of the fixed cylinder portion in the collapsed state. The retractable lens retaining frame moves the retractable lens group between the photographing position and the retracted position by a driving force to drive the movable lens barrel relative to the fixed cylinder portion.

12 Claims, 30 Drawing Sheets

(56) References Cited

FOREIGN PATENT DOCUMENTS

| | | |
|---|---|---|
| JP | 3771932 B1 | 2/2006 |
| JP | 2006-72004 A | 3/2006 |
| JP | 2006-330657 A | 12/2006 |
| JP | 2008-46502 A | 2/2008 |
| JP | 4641203 B2 | 12/2010 |
| JP | 2011-237575 A | 11/2011 |
| JP | 2012-42649 A | 3/2012 |
| JP | 2012-141519 A | 7/2012 |

* cited by examiner

US 8,970,971 B2

LENS BARREL

CROSS REFERENCE TO RELATED APPLICATIONS

The present application is based on and claims priority from Japanese Application Number 2010-148823, filed on Jun. 30, 2010, the disclosure of which is hereby incorporated by reference herein in its entirety.

BACKGROUND OF THE INVENTION

1. Field of the Invention

The present invention relates to a lens barrel configured to collapse a lens group in one mode and to use the lens group advanced to a predetermined position in another mode.

2. Description of the Related Art

Imaging apparatuses such as digital still cameras and digital video cameras (hereinafter, collectively referred to as the "digital camera") are facing strong demands for improvements in imaging performance and portability. To meet these demands, some imaging apparatuses are configured to, when shooting, extend lens groups in a photographing optical system from a camera easing while positioning the lens groups at distances necessary for the shooting from an image pickup device, and when not shooting, to retract at least one of the lens groups from a photographic optical axis and to collapse the lens groups in the camera casing with the distances between the lens groups and the image pickup device minimized to be less than a minimum distance required for shooting. Such an imaging apparatus has a smaller dimension in the photographic optical axis direction (hereinafter also referred to as a thickness dimension) when a lens barrel is in a collapsed state with a movable lens barrel stored, and is therefore suitable for carrying.

However, in the above technique, the retracted position of the lens groups retracted from the photographic optical axis is actually inside of the maximum outside diameter of a fixed cylinder portion of a camera main body. Therefore, while the thickness dimension when the movable lens barrel is stored can be reduced, the outside diameter of the fixed cylinder portion is increased. This leads to a problem that the camera main body (imaging apparatus) is increased in size when viewed from the front (object side).

To counter this problem, there has already been known a lens barrel configured to retract at least one of the retractable lens groups with a retractable lens retaining frame which retracts the lens group to the outside of the inside diameter of the fixed cylinder portion (Japanese Patent Application Publication No. 2006-330657). In the lens barrel, a retracting frame drive mechanism having a retracting frame drive source different from a back-and-forth drive source for moving the movable lens barrel in the photographic optical axis direction retracts the retractable lens retaining frame to the outside of the fixed cylinder portion in the process of collapsing when the lens group is collapsed (when no photographing is performed). As compared to the conventional configuration to retract the lens groups to the inside of the fixed cylinder portion, this lens barrel can neither cause an increase in the outside diameter of the movable lens barrel nor cause increases in the distances between the lens groups in the collapsed state.

However, the conventional lens barrel described above still has room for improvement in terms of miniaturization, since the retracting frame drive source for the retracting frame drive mechanism is provided in addition to the back-and-forth drive source.

SUMMARY OF THE INVENTION

The present invention has been made in consideration of the foregoing problems. A main object of the present invention is to provide a lens barrel which is capable of retracting a retractable lens group to the outside of the inside diameter of a fixed cylinder portion and achieves further size reduction.

A lens barrel according to an embodiment of the present invention includes: a plurality of lens groups including at least one retractable lens group, a plurality of lens retaining frames configured to retain the plurality of lens groups, respectively, a movable lens barrel configured to retain the plurality of lens retaining frames therein; and a fixed cylinder portion configured to retain the movable lens barrel therein. The plurality of lens retaining frames, the movable lens barrel and the fixed cylinder portion being configured to move the plurality of lens groups between a collapsed state where the plurality of lens groups are stored with at least one portion of the plurality of lens groups collapsed and a photographing state where at least one portion of the plurality of lens groups is moved toward an object. The plurality of lens retaining frames include a retractable lens retaining frame configured to movably retain the at least one retractable lens group so as to position the plurality of lens groups in photographing positions on a single photographic optical axis in the photographing state and to retract the at least one retractable lens group including at least one lens group to a retracted position outside an inside diameter position of the fixed cylinder portion in the collapsed state. The retractable lens retaining frame is configured to move the at least one retractable lens group between the photographing position and the retracted position by a driving force to drive the movable lens barrel relative to the fixed cylinder portion.

DETAILED DESCRIPTION OF THE PREFERRED EMBODIMENTS

Figure 1:
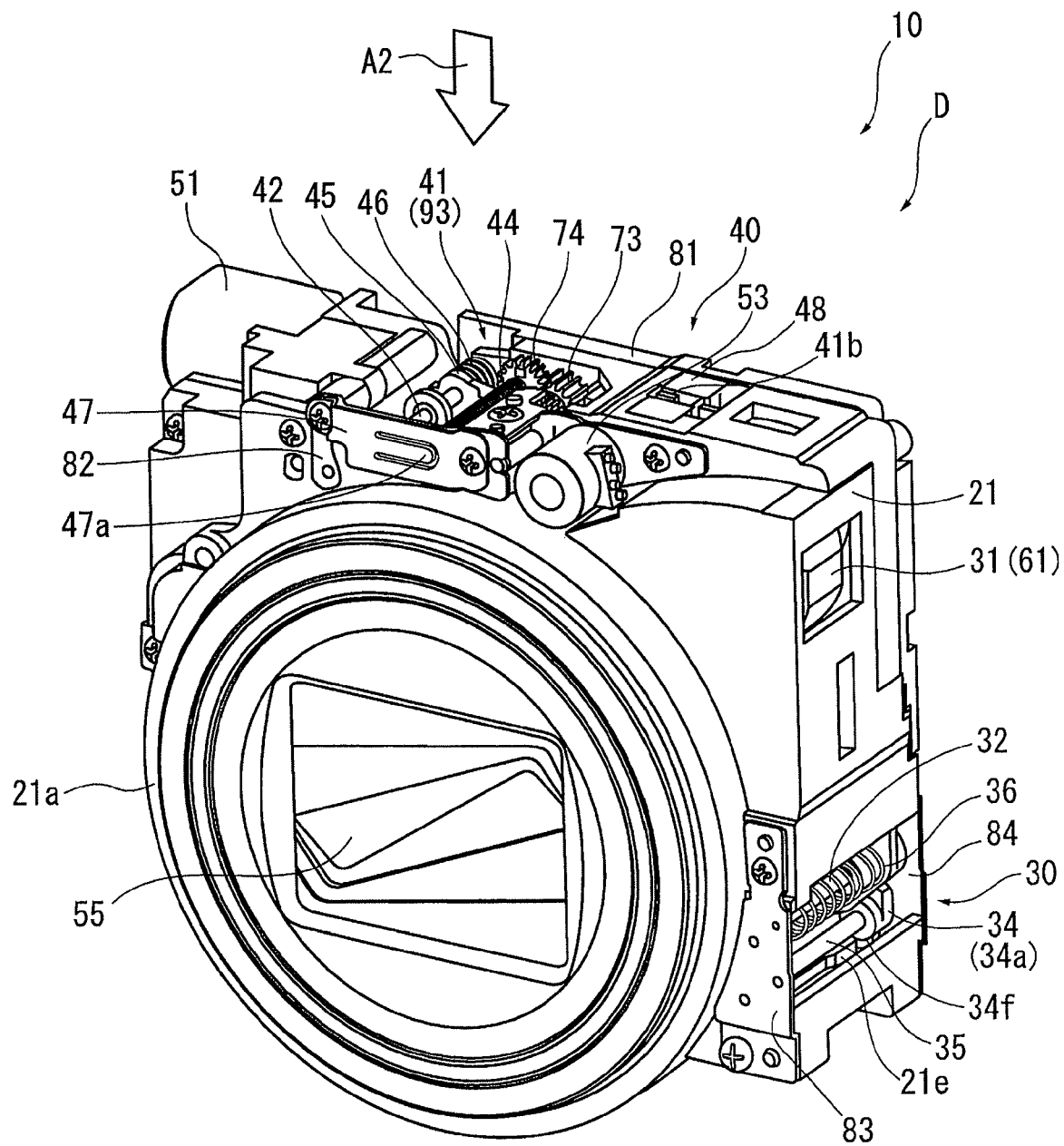
FIG. 1 is a schematic perspective view showing a collapsed stored state D of a lens barrel 10 as an example of the present invention when viewed from the object side.

With reference to the drawings, description is given below of embodiments of a lens barrel and an imaging apparatus having the same according to the present invention.

With reference to FIGS. 1 to 11, description is given of a schematic configuration of a lens barrel 10 as an embodiment of the lens barrel according to the present invention.

An optical apparatus including the lens barrel 10 includes a first lens group 11, a second lens group 12, a third lens group 13, a fourth lens group 14, a shutter/aperture unit 15, a solid-state imaging device 16, a first lens retaining frame 17, a cover glass 18, a low-pass filter 19, a fixed frame 21, a first rotary cylinder 22, a first liner 23, a second rotary cylinder 24, a second liner 25, a cam cylinder 26, a straight cylinder 27, a drive lever 34, a zoom motor 51, a lens barrier 55, a barrel base 81, a presser plate 82, a presser plate 83, and a presser plate 84. Note that the first rotary cylinder 22, the second rotary cylinder 24 and the straight cylinder 27 function as a movable lens barrel. Moreover, the zoom motor 51 functions as a back-and-forth drive source for moving, with a spline gear and the like, the movable lens barrel back and forth in a photographic optical axis OA direction as well as lens retaining frame drive means for driving a movable lens retaining frame through the movable lens barrel.

In a photographing state P (see the upper half of FIG. 4) of this optical apparatus (photographing lens system), the first lens group 11, the second lens group 12, the third lens group 13 and the fourth lens group 14 are arranged in this order from the object side. At the same time, the shutter/aperture unit 15 is inserted between the second and third lens groups 12 and 13. Moreover, the solid-state imaging device 16 including a CCD (charge-coupled device) and other components is disposed at the image plane side of the fourth lens group 14. The first to fourth lens groups 11 to 14 constitute a variable focal length zoom lens.

The first lens group 11 includes one or more lenses. The first lens group 11 is fixedly retained by the straight cylinder 27 by means of the lens retaining frame 17 which integrally retains the lenses. On the object side of the first lens group 11, the heretofore known lens barrier 55 is provided. The lens barrier 55 is configured to open an optical path of the photographing lens system in the photographing state, and to block the optical path in a collapsed state.

The second lens group 12 includes one or more lenses. The second lens group 12 is supported by the cam cylinder 26 and the second liner 25 in such a manner that a cam follower formed in a second lens retaining frame (not explicitly shown) which integrally retains the second lens group 12 is inserted into a cam groove 26b (see FIG. 7) for second lens group in the cam cylinder 26 to be engaged with a straight groove 25a in the second liner 25.

The third lens group 13 includes one or more lenses. The third lens group 13 is integrally retained by a third lens retaining frame 31. Moreover, the third lens group 13 is retracted from the photographic optical axis OA (photographing optical path) in a collapsed stored state, and is positioned on the photographic optical axis OA (photographing optical path) in the photographing state. This is described in detail later.

The fourth lens group 14 includes one or more lenses. The fourth lens group 14 is integrally retained by a fourth lens retaining frame 41. Moreover, the fourth lens group 14 is retracted from the photographic optical axis OA (photographing optical path) in the collapsed stored state, and is positioned on the photographic optical axis OA (photographing optical path) in the photographing state. This configuration is described in detail later. In this embodiment, the fourth lens group 14 is used as a focus lens for bringing into focus, i.e., focusing.

The shutter/aperture unit 15 includes a shutter and an aperture stop. The shutter/aperture unit 15 is supported by the cam cylinder 26 and the second liner 25 in such a manner that a cam follower integrally formed therein is inserted into a cam groove 26c (see FIG. 7) for shutter/aperture unit in the cam cylinder 26 to be engaged with the straight groove 25a in the second liner 25. The fixed frame 21 has a cylindrical fixed cylinder portion 21a (see FIGS. 2 and 3, etc.) inside. In an inner peripheral surface of the fixed cylinder portion 21a, straight grooves 21b along an axial direction, cam grooves 21c and a clearance groove 21d (see FIG. 9) are formed. Key portions 23a (see FIGS. 2 and 4) to be described later of the first liner 23 are engaged with the straight grooves 21b, while cam followers 22a (see FIG. 5) to be described later of the first rotary cylinder 22 are engaged with the cam grooves 21c. The clearance groove 21d enables disposition of the drive lever 34 which bridges an outer position and an inner position of the fixed cylinder portion 21a.

Figure 5:
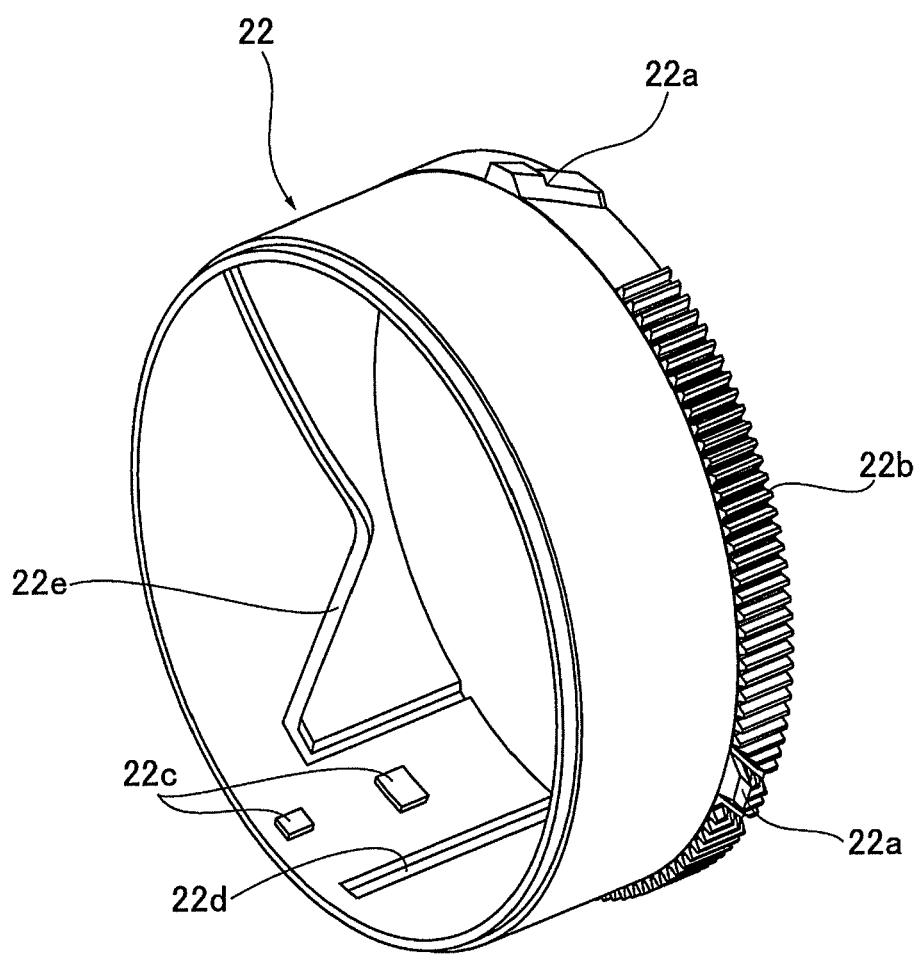
FIG. 5 is a perspective view of a first rotary cylinder 22 to be fitted to a helicoid.
Figure 10:
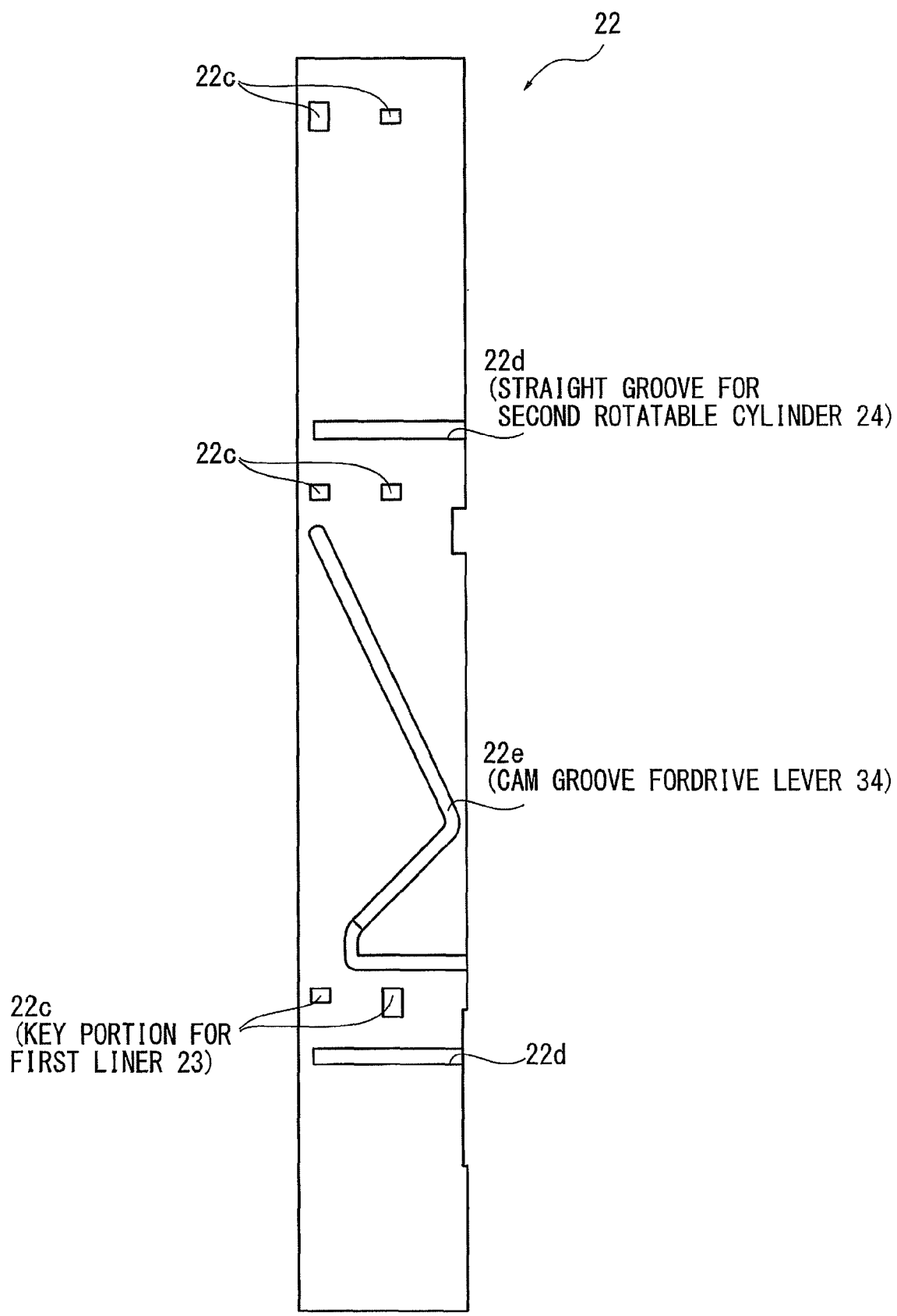
FIG. 10 is a schematic expanded view showing the shapes of key portions, straight grooves and a cam groove formed in the first rotary cylinder 22.

In an outer peripheral surface of a base end portion of the first rotary cylinder 22, the helicoidal cam followers 22a and a gear portion 22b (see FIG. 5) are formed. In an inner peripheral surface of the first rotary cylinder 22, key portions 22c, a straight groove 22d and a cam groove 22e are provided as shown in FIGS. 5 and 10. The key portions 22c are paired and protrude toward the rotation center (hereinafter also referred to as a "radial direction"). The key portions 22c function as straight guide members. The straight groove 22d is a guide groove along the photographic optical axis OA (photographing optical path). The cam groove 22e is a guide groove for movement of the drive lever 34. The action in the cam groove 22e is described in detail later.

Figure 11:
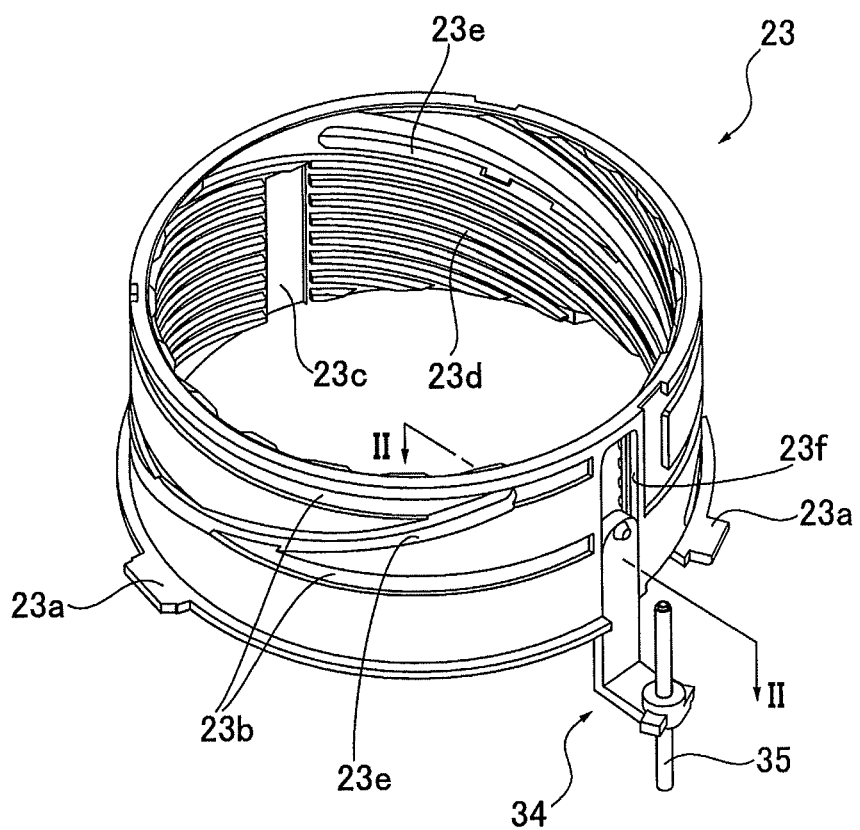
FIG. 11 is a schematic perspective view showing that a drive lever 34 is fitted to the first liner 23.

In an outer peripheral surface of the first liner 23, the key portions 23a and guide grooves 23b are provided as shown in FIG. 11. The key portions 23a are formed to protrude from the base end portion, and are engaged with the straight grooves 21b of the fixed cylinder portion 21a (see FIG. 2). The guide grooves 23b are provided along the plane orthogonal to the photographic optical axis OA so as to be paired in the photographic optical axis OA (photographing optical path) direction. The pair of key portions 22c (see FIGS. 5 and 10) of the first rotary cylinder 22 are engaged with the guide grooves 23b. Such a configuration allows the first rotary cylinder 22 and the first liner 23 to be integrally moved in the photographic optical axis OA (photographing optical path) direction, and also enables relative rotational movement thereof about the photographic optical axis OA.

Figure 8:
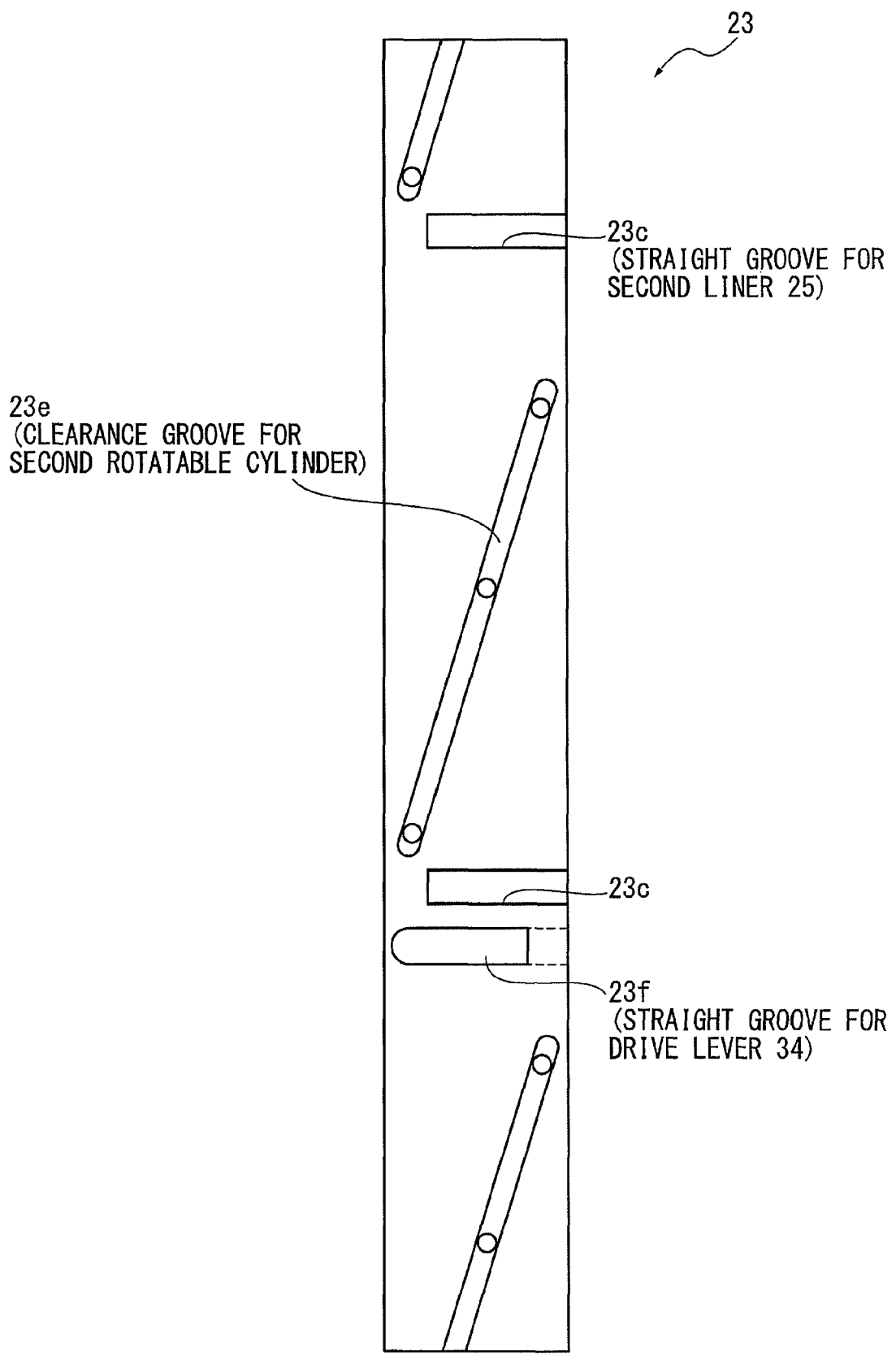
FIG. 8 is a schematic expanded view showing the shapes of a cam groove and a key groove formed in a first liner 23 while omitting a helicoid.

In an inner peripheral surface of the first liner 23, first straight grooves 23c and a helicoid 23d (see FIG. 11) are provided as shown in FIGS. 8 and 11. The first straight grooves 23c are extended along the photographic optical axis OA (photographing optical path) direction. Key portions 25b provided so as to protrude on an outer peripheral surface of a base end portion of the second liner 25 are engaged with the first straight grooves 23c. The helicoid 23d is screwed to a helicoid (not shown) formed on an outer peripheral surface of a base end portion of the second rotary cylinder 24.

Furthermore, a clearance groove 23e and a second straight groove 23f are formed in the first liner 23. The clearance groove 23e is provided penetrating a peripheral wall portion to insert a cam follower 24a (see FIG. 4) of the second rotary cylinder 24 to be described later. The second straight groove 23f is provided along the photographic optical axis OA (photographing optical path) direction so as to receive the drive lever 34. In this embodiment, the second straight groove 23f penetrates the peripheral wall portion at its intermediate position in the photographic optical axis OA direction, and is formed into a concave shape by perforating the outer peripheral surface in the vicinity of the base end portion (see FIG. 28, etc.). Moreover, in the side view of the first liner 23, the second straight groove 23f of this embodiment has a stepped shape with step portions 23g (see FIG. 25) on both sides in a circumferential direction. The action in the second straight groove 23f is described in detail later.

Although not shown, a helicoid is formed on the outer peripheral surface of the base end portion of the second rotary cylinder 24, and the helicoid is screwed to the helicoid 23d (see FIG. 11) provided on the inner peripheral surface of the first liner 23. Moreover, the cam follower 24a (see FIG. 4) is provided so as to protrude on the outer peripheral surface near the base end portion of the second rotary cylinder 24, and is engaged with the straight groove 22d (see FIGS. 5 and 10) provided in the inner peripheral surface of the first rotary cylinder 22 through the clearance groove 23e (see FIG. 8, etc.) for cam follower in the first liner 23.

Figure 6:
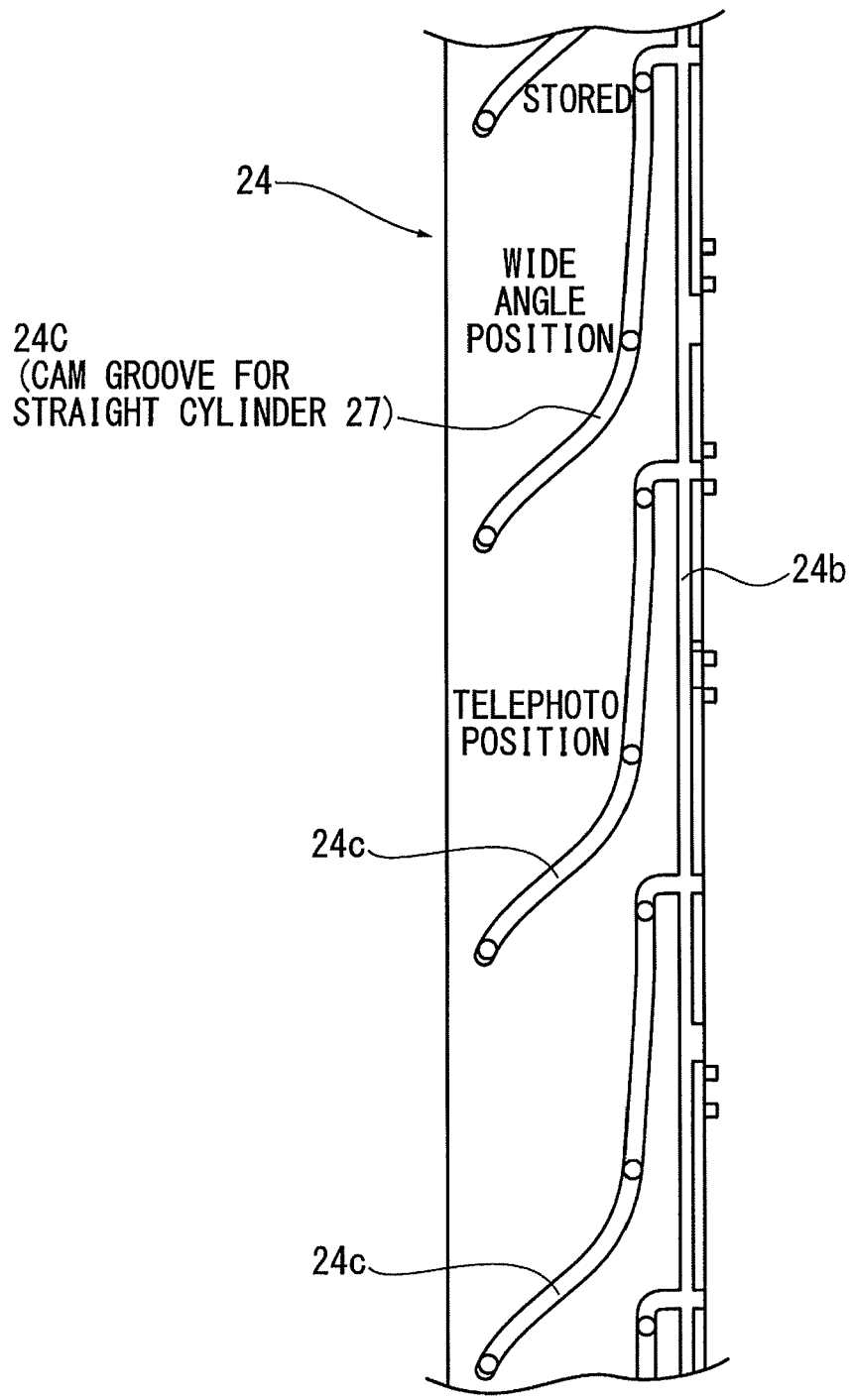
FIG. 6 is a schematic expanded view showing the shape of a cam groove formed in a second rotary cylinder 24.

On the inner peripheral surface of the second rotary cylinder 24, a guide groove 24b and cam grooves 24c are formed as shown in FIG. 6. The guide groove 24b is provided along the plane orthogonal to the photographic optical axis OA (photographing optical path). Although not shown, a follower (or a key) that is a straight guide member provided so as to protrude on the outer peripheral surface of the second liner 25 is engaged with the guide groove 24b. Such a configuration allows the second liner 25 and the second rotary cylinder 24 to be integrally moved in the photographic optical axis OA (photographing optical path) direction, and also enables relative rotational movement thereof about the photographic optical axis OA. The cam groove 24c is a cam groove for movement of the straight cylinder 27.

Figure 4:
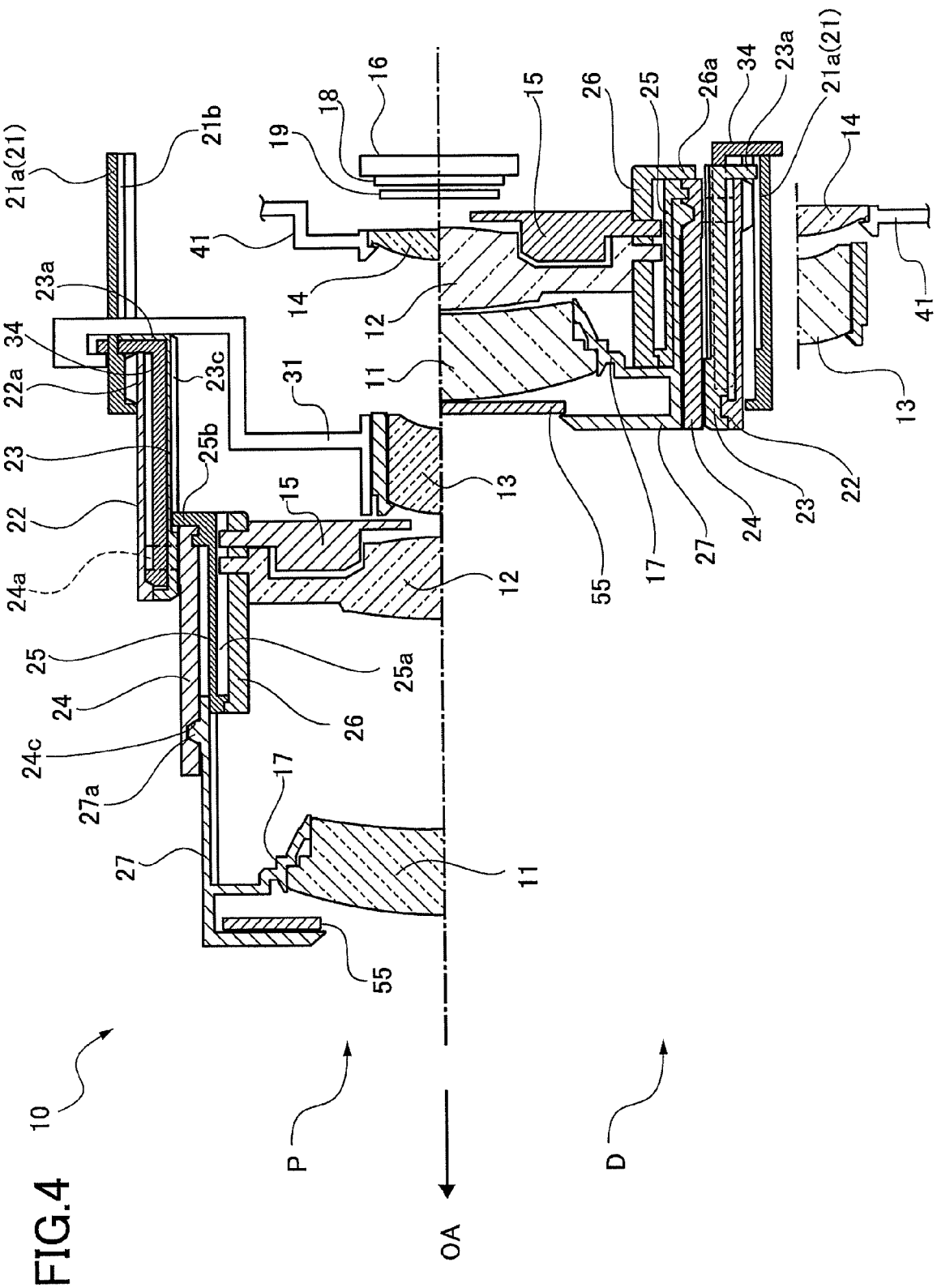
FIG. 4 is a longitudinal sectional view showing lens groups in the lens barrel 10, lens retaining frames, and main portions of the lens barrel 10 in the photographing state P having the lens groups protrude and in the collapsed stored state D having the lens groups collapsed and stored.

In the inner peripheral surface of the second liner 25, although not shown, a guide groove is formed along the plane orthogonal to the photographic optical axis OA (photographing optical path). A follower (or a key) that is a straight guide member provided so as to protrude on the outer peripheral surface (front side) of the cam cylinder 26 is engaged with the guide groove. As shown in FIG. 4, the cam cylinder 26 is fitted to the inner peripheral surface of the second liner 25. The cam cylinder 26 has a locking protrusion 26a provided so as to protrude on the outer peripheral surface of the base end portion. The locking protrusion 26a is fitted and locked to the base end portion of the second rotary cylinder 24 so that the cam cylinder 26 is rotated integrally with the second rotary cylinder 24. Such a configuration allows the cam cylinder 26 and the second liner 25 to be integrally moved in the photographic optical axis OA (photographing optical path) direction, and also enables relative rotational movement thereof about the photographic optical axis OA.

The base end side of the straight cylinder 27 is inserted between the second liner 25 and the second rotary cylinder 24. A cam follower 27a is provided so as to protrude on an outer peripheral surface near the base end portion of the straight cylinder 27. The cam follower 27a is engaged with the cam groove 24c (see FIG. 6) formed in the inner peripheral surface of the second rotary cylinder 24. Moreover, although not shown, a straight groove is formed along the axial direction in the inner peripheral surface of the straight cylinder 27, and the key portion on the outer peripheral surface of the second liner 25 is engaged with the straight groove.

In the lens barrel 10, the driving force of the zoom motor 51 (see FIG. 1, etc.) is accordingly transmitted through gears (not shown) meshed with the gear portion 22b (see FIG. 5) to rotate the first rotary cylinder 22. This allows the first to third lens groups 11 to 13 and the shutter/aperture unit 15 to perform a predetermined zooming operation.

Figure 7:
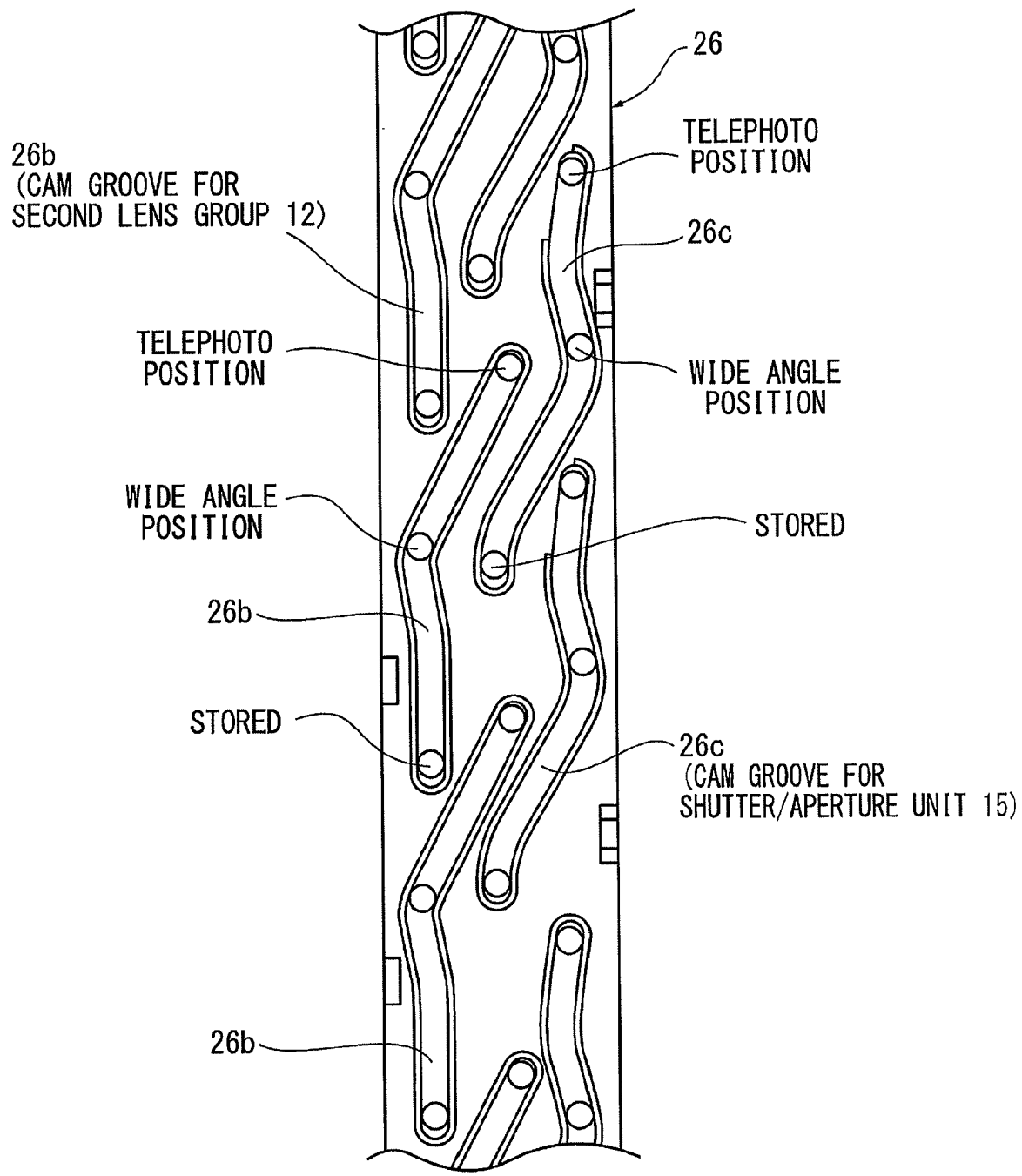
FIG. 7 is a schematic expanded view showing the shape of a cam groove formed in a cam cylinder 26.
Figure 9:
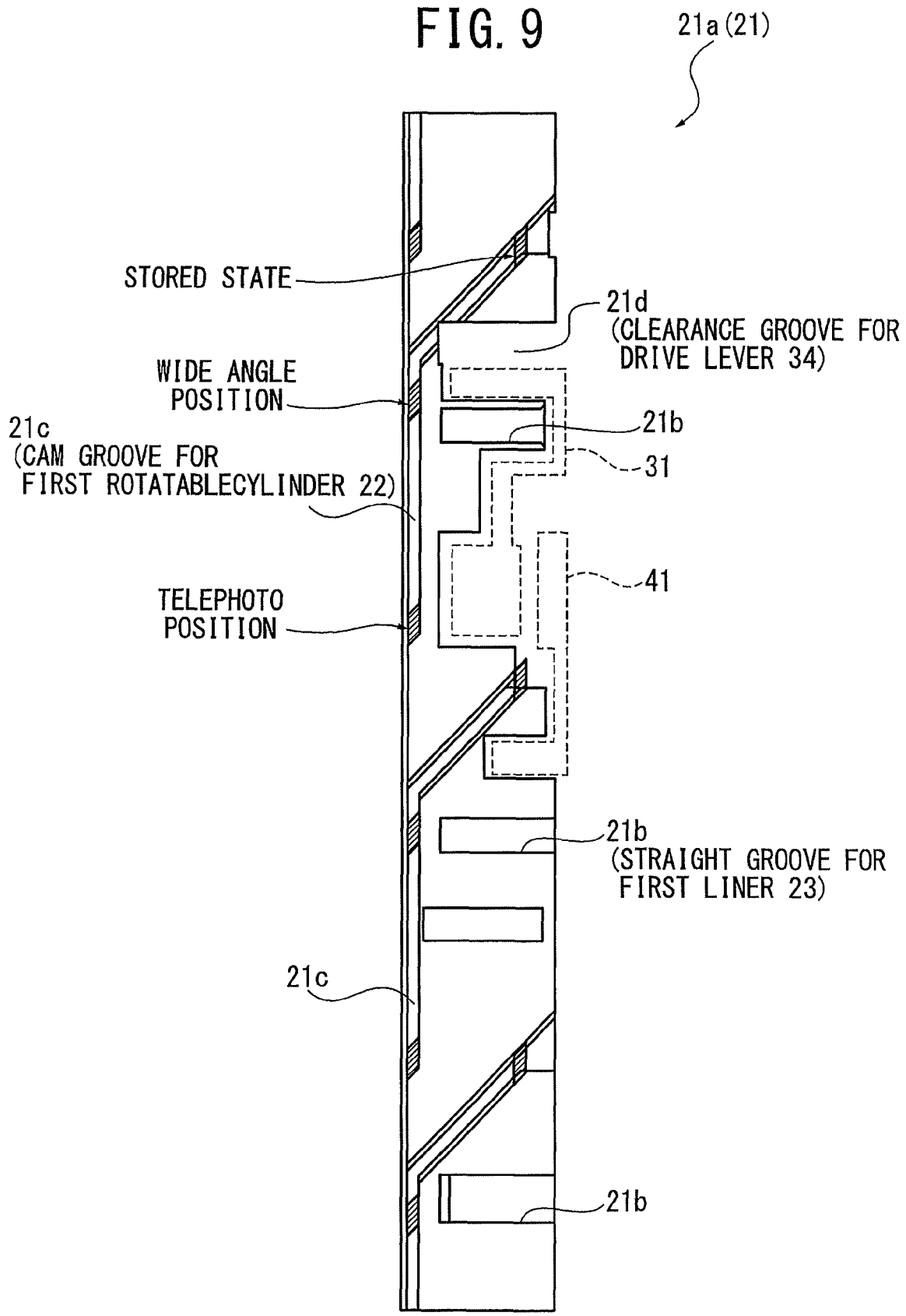
FIG. 9 is a schematic expanded view showing the shapes of a cam groove and a key groove formed in a fixed cylinder portion 21a of a fixed frame 21 while omitting a helicoid.

FIG. 6 shows the guide groove 24b engaged with the follower (or the key) on the outer peripheral surface of the second liner 25, and the cam grooves 24c engaged with the cam followers 27a of the straight cylinder 27, in the second rotary cylinder 24. FIG. 7 shows the cam grooves 26b engaged with the cam followers in the lens retaining frame of the second lens group 12, and the cam grooves 26c engaged with the cam followers of the shutter/aperture unit 15, in the cam cylinder 26. FIG. 8 shows the clearance groove 23e for the cam follower 24a of the second rotary cylinder 24, the first straight grooves 23c engaged with the key portions 25b of the second liner 25, and the second straight groove 23f engaged with the drive lever 34, in the first liner 23. FIG. 9 shows the straight grooves 21b engaged with the key portions 23a of the first liner 23, the cam grooves 21c engaged with the cam followers 22a of the first rotary cylinder 22, and the clearance groove 21d for bridging the outer and inner sides of the fixed cylinder portion 21a, in the fixed cylinder portion 21a of the fixed frame 21. FIG. 10 shows the key portions 22c engaged with the guide grooves 23b of the first liner 23, the straight grooves 22d engaged with the cam followers 24a of the second rotary cylinder 24, and the cam groove 22e engaged with a cam protrusion 34h to be described later of the drive lever 34, in the first rotary cylinder 22.

Specifically, in the above configuration, the first rotary cylinder 22 is not just helicoid-screwed with the fixed cylinder portion 21a, but has the cam followers 22a engaged with the helicoidal cam grooves 21c (see FIG. 9). When driven from a stored state of the cam grooves 21c to a wide angle position, the first rotary cylinder 22 is completely extended to the maximum extended position. Thereafter, as shown in FIG. 9, the first rotary cylinder 22 is rotated at a fixed position without being moved in the photographic optical axis OA (photographing optical path) direction when driven from the wide angle position to a telephoto position since the object-side end of the cam groove 21c is parallel to the end face of the fixed cylinder portion 21a. To counteract this, the first rotary cylinder 22 is extended toward the subject while being rotated at first when moved from the collapsed state to the wide angle position, and reaches the maximum extended position at some point in the rotation. In other words, the first rotary cylinder 22, which is a lens barrel positioned close to the fixed cylinder portion 21a, and the first liner 23 are completely extended in an early stage of an extending operation. This makes it possible to obtain in advance a space into which the third lens retaining frame 31 is inserted on the photographic optical axis OA (photographing optical path). Accordingly, the third lens retaining frame 31 as a retractable lens retaining frame can start moving forward since the space for insertion thereof is secured.

The positions of the first rotary cylinder 22 and the like can be controlled by a drive pulse count generated, in the case of the zoom motor 51 (see FIG. 1) configured using a general DC (direct-current) motor, by a zoom count detector including a pinion gear attached directly to an output shaft of the zoom motor 51 and having an encoder structure and a photo-interrupter disposed adjacent to the pinion gear, for example, in. Meanwhile, although the DC motor is used as the drive source for moving the first rotary cylinder 22 and the drive position of the first rotary cylinder 22 is detected by the detector including the encoder and the photo-interrupter, the similar function can be accomplished by substituting a pulse motor for the whole structure described above.

Next, with reference to FIGS. 1 to 29, description is given of a configuration in which, in the lens barrel 10, the third and fourth lens groups 13 and 14 as the retractable lens retaining frame are retracted from the photographic optical axis OA (photographing optical path) in the collapsed stored state, and are disposed on the photographic optical axis OA (photographing optical path) in the photographing state.

Figure 2:
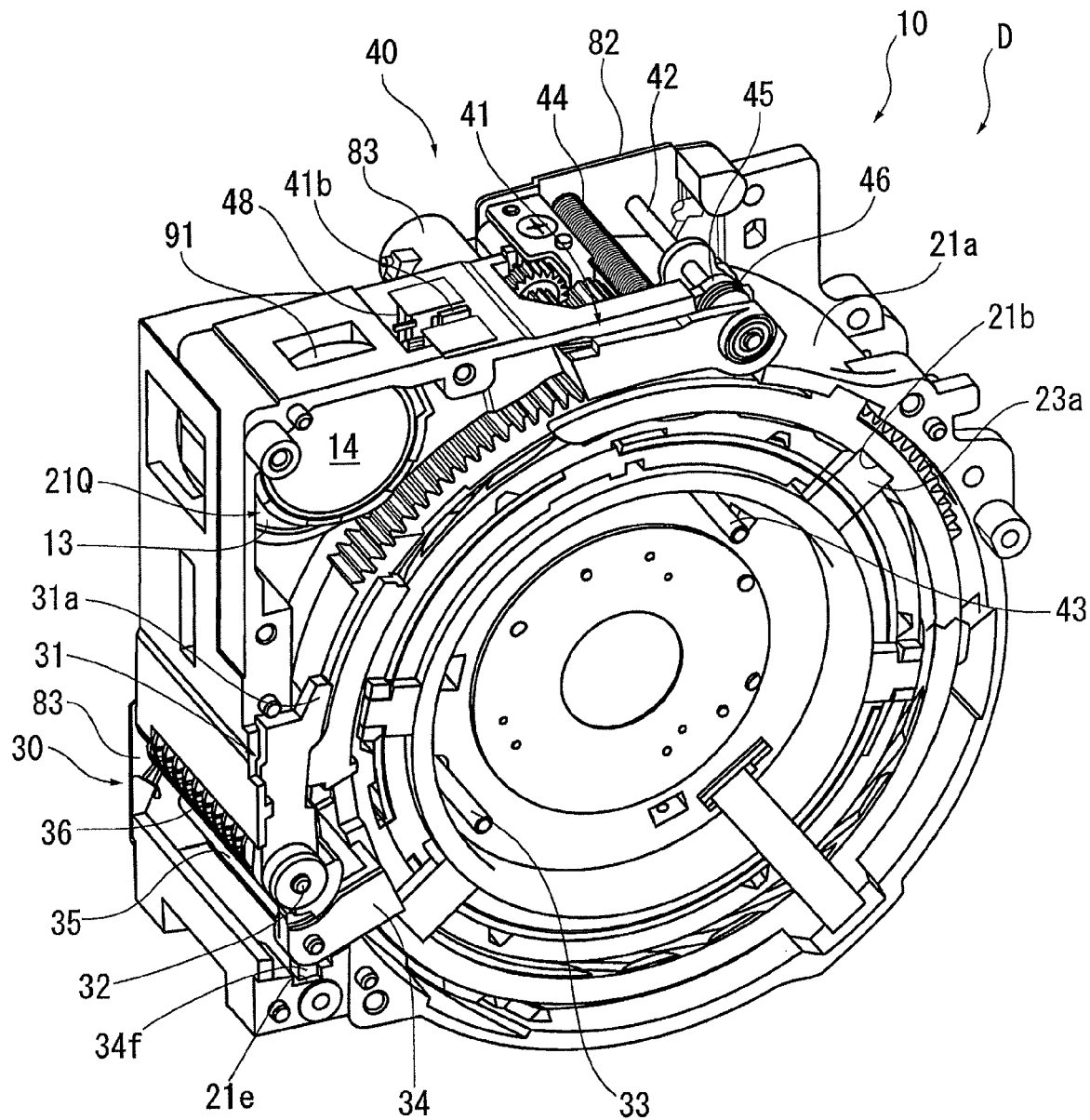
FIG. 2 is a schematic perspective view showing the collapsed stored state D of the lens barrel 10 when viewed from the image plane side.
Figure 3:
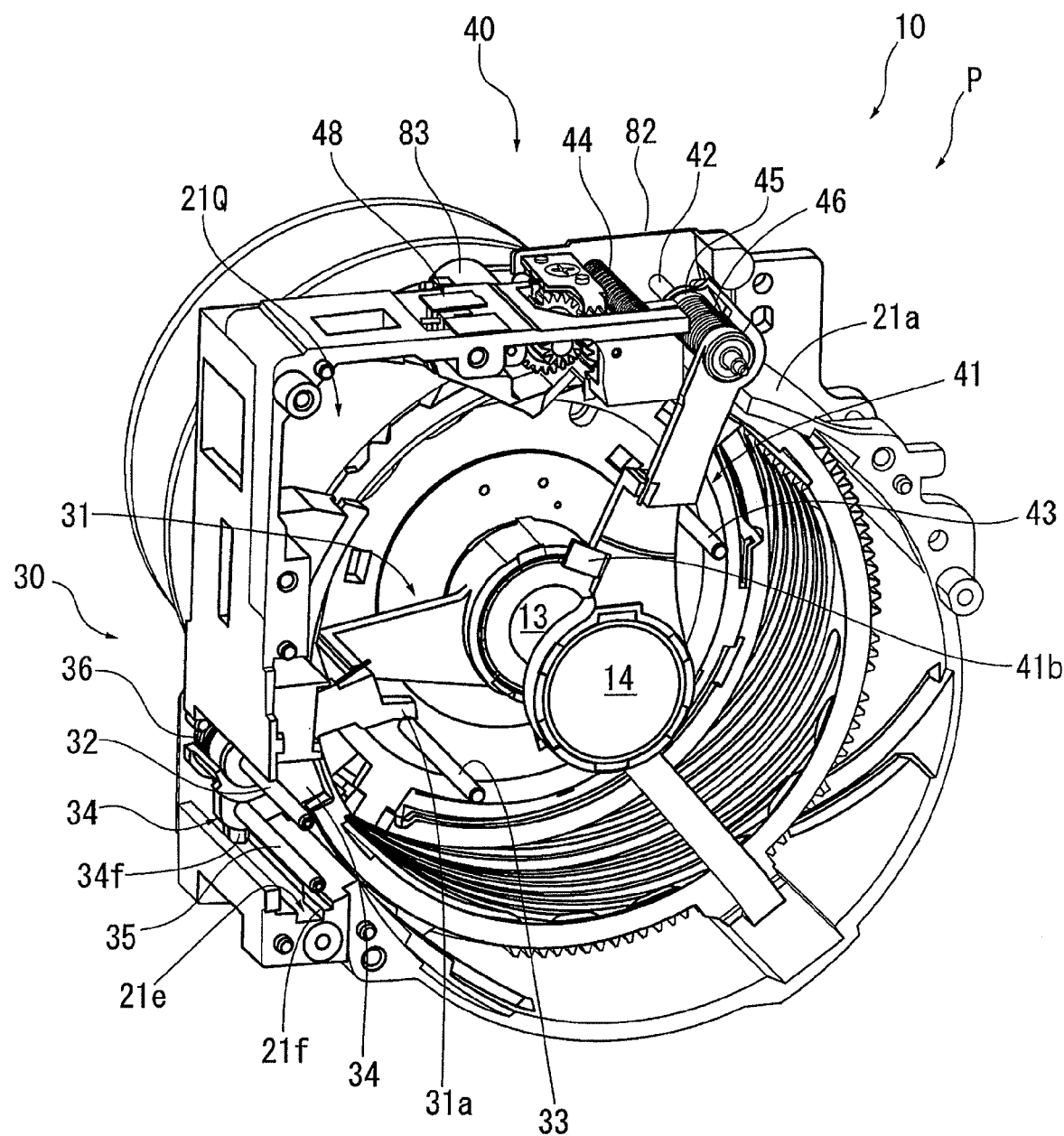
FIG. 3 is a schematic perspective view showing a photographing state P of the lens barrel 10 when viewed from the image plane side as in FIG. 2.

In the lens barrel 10, as shown in FIGS. 1 to 3, when viewed from the front, the third lens retaining frame 31 is provided on the lateral side of the fixed frame 21, and the fourth lens retaining frame 41 is provided on the upper side of the fixed frame 21. In one of the corners of the fixed frame 21, a storing space 21Q is formed as a retracted position at which the third and fourth lens retaining frames 31 and 41 are stored (see FIGS. 2 and 3). The storing space 21Q is provided lateral to the fixed cylinder portion 21a of the fixed frame 21, and the notched portion (see FIG. 9) provided in the fixed cylinder portion 21a allows the third and fourth lens retaining frames 31 and 41 to be moved between the storing space and the inner position of the fixed cylinder portion 21a. Accordingly, the third and fourth lens retaining frames 31 and 41 can be retracted beyond the maximum outside diameter of the movable lens barrel (here, the maximum outside diameter of the first rotary cylinder 22) in the collapsed state, as shown in FIGS. 2 to 4. In the storing space 21Q, the third and fourth lens groups 13 and 14 are stored in a state of overlapping each other in the optical axis direction (see FIGS. 2 and 4).

As shown in FIG. 4, the third and fourth lens retaining frames 31 and 41 are disposed between the shutter/aperture unit 15 and the solid-state imaging device 16. In this embodiment, the third lens retaining frame 31 is disposed closest to the shutter/aperture unit 15, and the fourth lens retaining frame 41 is disposed closest to the solid-state imaging device 16. For the third and fourth lens retaining frames 31 and 41, back-and-forth drive mechanisms (30 and 40 (see FIG. 2, etc.)) are provided, respectively. Such mechanisms allow the third and fourth lens retaining frames 31 and 41 to be retracted from the photographic optical axis OA (photographing optical path) and then stored in the storing space 21Q (retracted position) in the collapsed state (see FIG. 2) of the movable lens barrel (rotary cylinders 22 and 24 and the straight cylinder 27) in the fixed frame 21, to be moved forward onto the photographic optical axis OA (photographing optical path) (photographing position) in the extended state (see FIG. 3) of the movable lens barrel out of the fixed frame 21, and then to be moved in the photographic optical axis OA direction (extending direction).

In this embodiment, the storing operation is executed in the following manner in order to retract both of the third and fourth lens groups 13 and 14. Specifically, the fourth lens retaining frame 41 is first moved to the storing position (the storing space 21Q), and then the storing operation of the third lens retaining frame 31 of the third lens group 13 disposed closer to the object (front) than the fourth lens group 14 is allowed. Thereafter, along with the movement of the third lens retaining frame 31 (the third lens group 13) to the storing position (the storing space 21Q), the first lens group 11, the second lens group 12 and the shutter/aperture unit 15 are moved to the collapsed stored position.

First, description is given of configurations of the fourth lens retaining frame 41 and the back-and-forth drive mechanism 40. As shown in FIGS. 12 to 20, the back-and-forth drive mechanism 40 in the fourth lens retaining frame 41 (the fourth lens group 14) includes a fourth group main guide shaft 42, a fourth group sub-guide shaft 43, a fourth group lead screw 44, a screw member (rack) 45, a compression torsion spring 46, a screw biasing piece 47 (see FIGS. 1 and 14), a slidable wall portion 49 (see FIG. 19, etc.), a fourth group motor 53, and gears 71 to 74, for the fourth lens retaining frame 41 retaining the fourth lens group 14. Note that FIGS. 12, 13 and 17 omit illustration of the slidable wall portion 49 to facilitate the understanding of the other components. Similarly, in FIG. 16, a section other than a step portion 96a in an inner wall surface of a connected wall section 96 to be described later is dotted to facilitate the understanding thereof.

Figure 15:
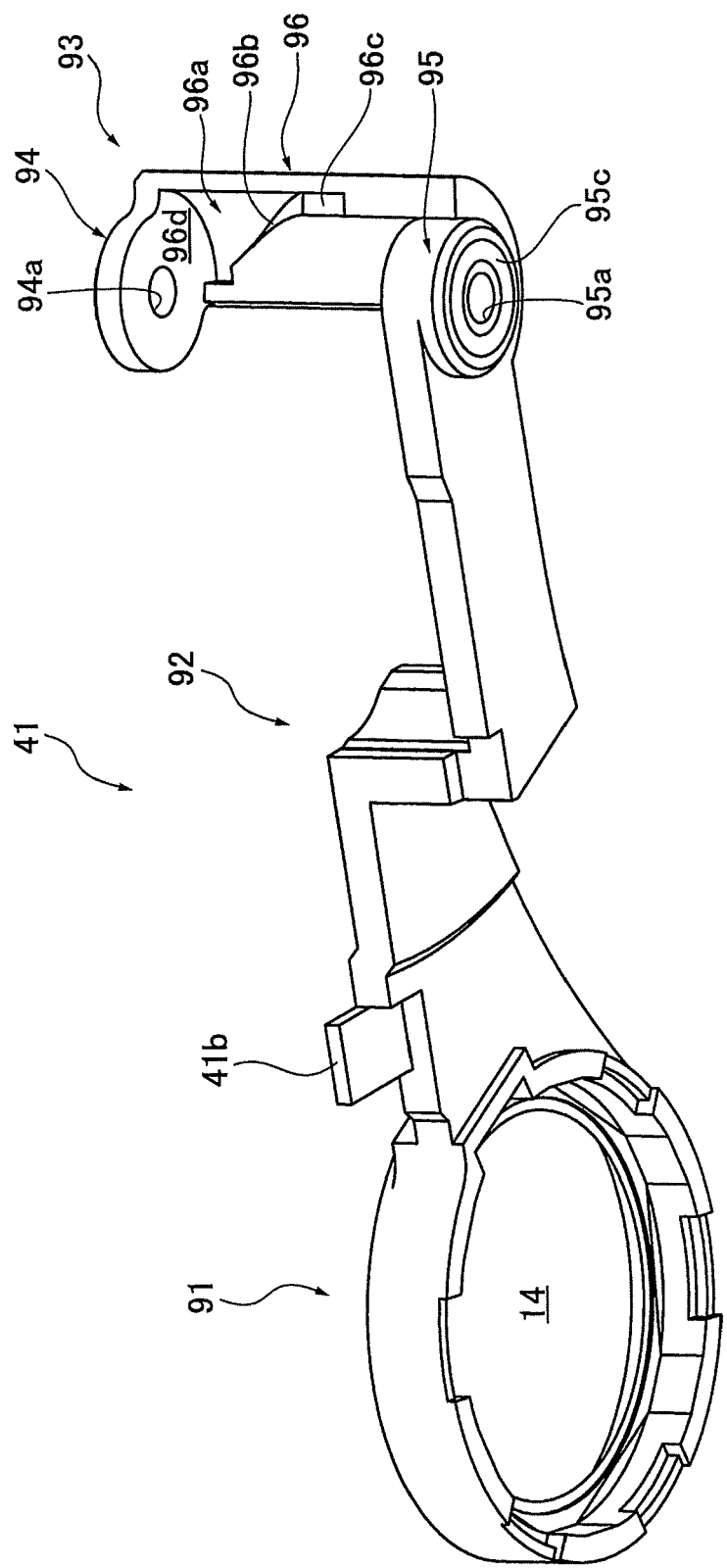
FIG. 15 is a schematic perspective view for explaining the configuration of the fourth lens retaining frame 41.

The fourth lens retaining frame 41 retains the fourth lens group 14 at one end, and has the other end movably and slidably inserted into the fourth group main guide shaft 42. As shown in FIG. 15, the fourth lens retaining frame 41 has a fourth lens retaining portion 91, a fourth lens retaining frame arm portion 92 and a fourth lens retaining frame rotary base 93.

The fourth lens retaining portion 91 is positioned at one end (tip) of the fourth lens retaining frame 41, and retains the fourth lens group 14. The fourth lens retaining portion 91 is a frame member having a cylindrical shape as a whole.

The fourth lens retaining frame arm portion 92 connects the fourth lens retaining portion 91 to the fourth lens retaining frame rotary base 93, and constitutes an arm portion of the fourth lens retaining frame 41. The fourth lens retaining frame arm portion 92 has a bent portion having a crank shape as a whole, which is extended parallel to the fourth group main guide shaft 42 at its intermediate position. The other side thereof is continuous with the fourth lens retaining frame rotary base 93.

The fourth lens retaining frame rotary base 93 includes: a disk-shaped front-side shaft fitting portion 94 and a disk-shaped rear-side shaft fitting portion 95, which have insertion holes (94a and 95a) provided on the same axis; and a connecting wall portion 96 for connecting the both portions 94 and 95 so as to form an approximately cylindrical space therebetween. The insertion holes 94a and 95a of the front-side and rear-side shaft fitting portions 94 and 95 are through-holes to which allow the fourth group main guide shaft 42 to be inserted thereinto while being movable relative to the fourth group main guide shaft 42. The rear-side shaft fitting portion 95 is continuous with the fourth lens retaining frame arm portion 92. In the plane orthogonal to the axis of the insertion holes 94a and 95a (which coincides with the axis of the inserted fourth group main guide shaft 42), the connecting wall portion 96 has a cylindrical shape curved around the axis (see FIG. 19).

Figure 16:
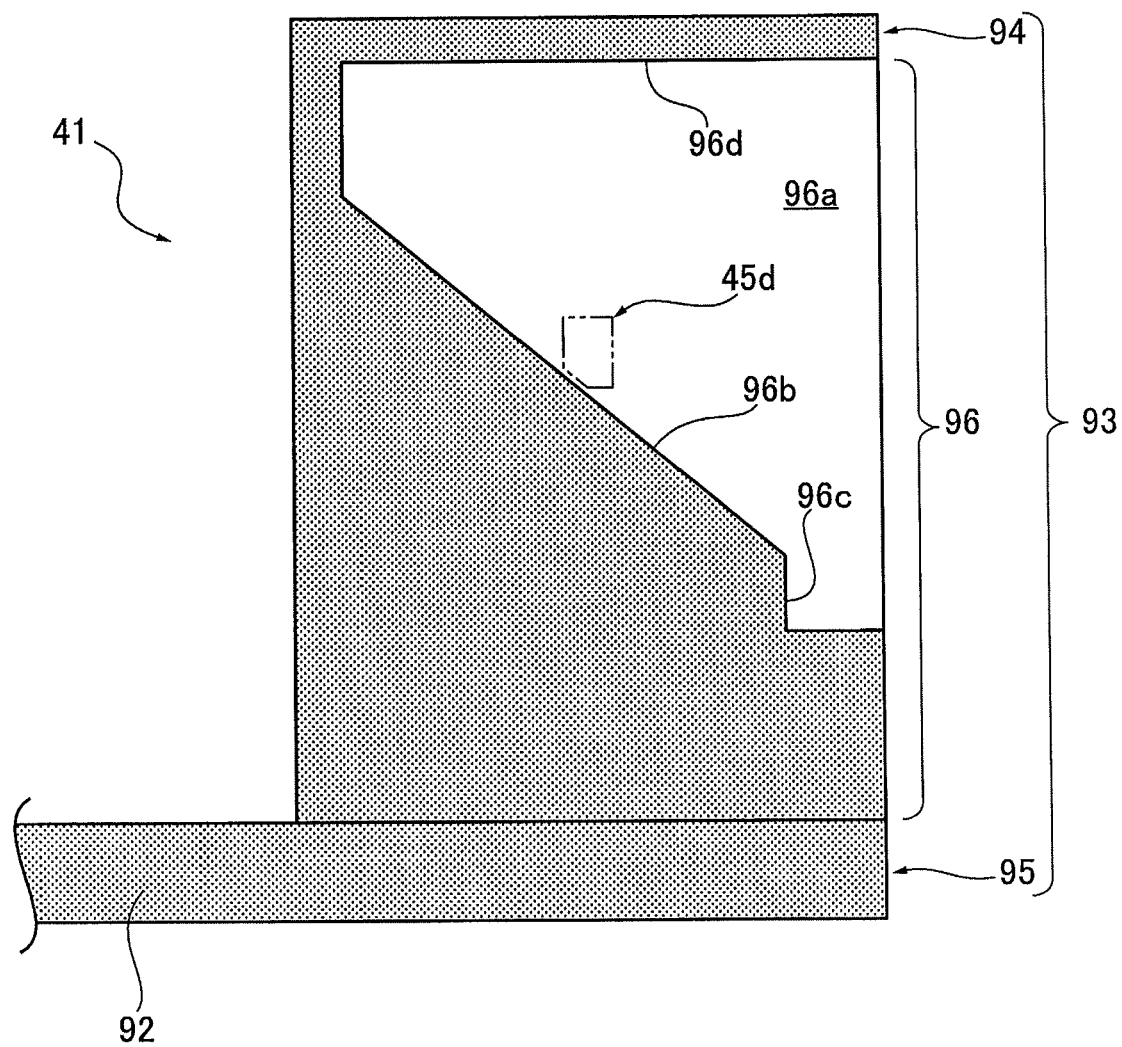
FIG. 16 is an explanatory view showing a configuration of a step portion 96a of a connected wall portion 96 of a fourth lens retaining frame rotary base 93 in the fourth lens retaining frame 41.

On an inner wall surface of the connecting wall portion 96, a step portion 96a is provided, which is recessed from the cylinder inner peripheral surface. As shown in FIG. 16, the step portion 96a includes: a cam face 96b having a cam slope shape on the base end side; a lateral engaging face 96c continuous with a lower end of the cam face and extended in the photographic optical axis OA direction; and a front-side engaging face 96d formed of a lower end face of the front-side shaft fitting portion 94 to be a plane approximately perpendicular to the photographic optical axis OA.

Figure 17:
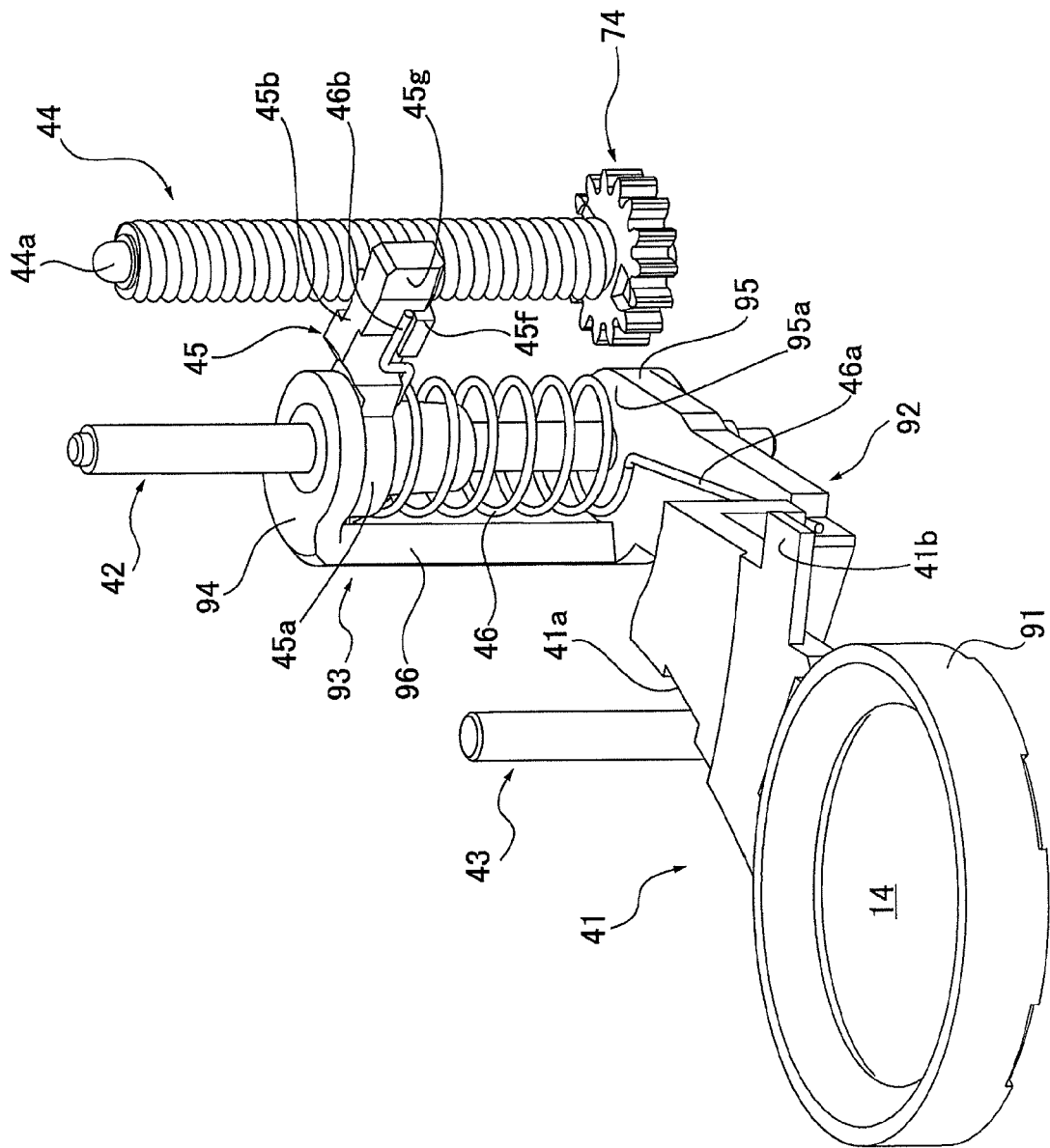
FIG. 17 is a schematic perspective view for explaining a configuration around the fourth lens retaining frame 41.

The insertion holes 94a and 95a of the front-side and rear-side shaft fitting portions 94 and 95 allow the fourth lens retaining frame rotary base 93 to be supported by the fourth group main guide shaft 42 so as to be rotatable about the axis of the fourth group main guide shaft 42 and to be movable in the photographic optical axis OA direction (see FIG. 17, etc.).

Figure 12:
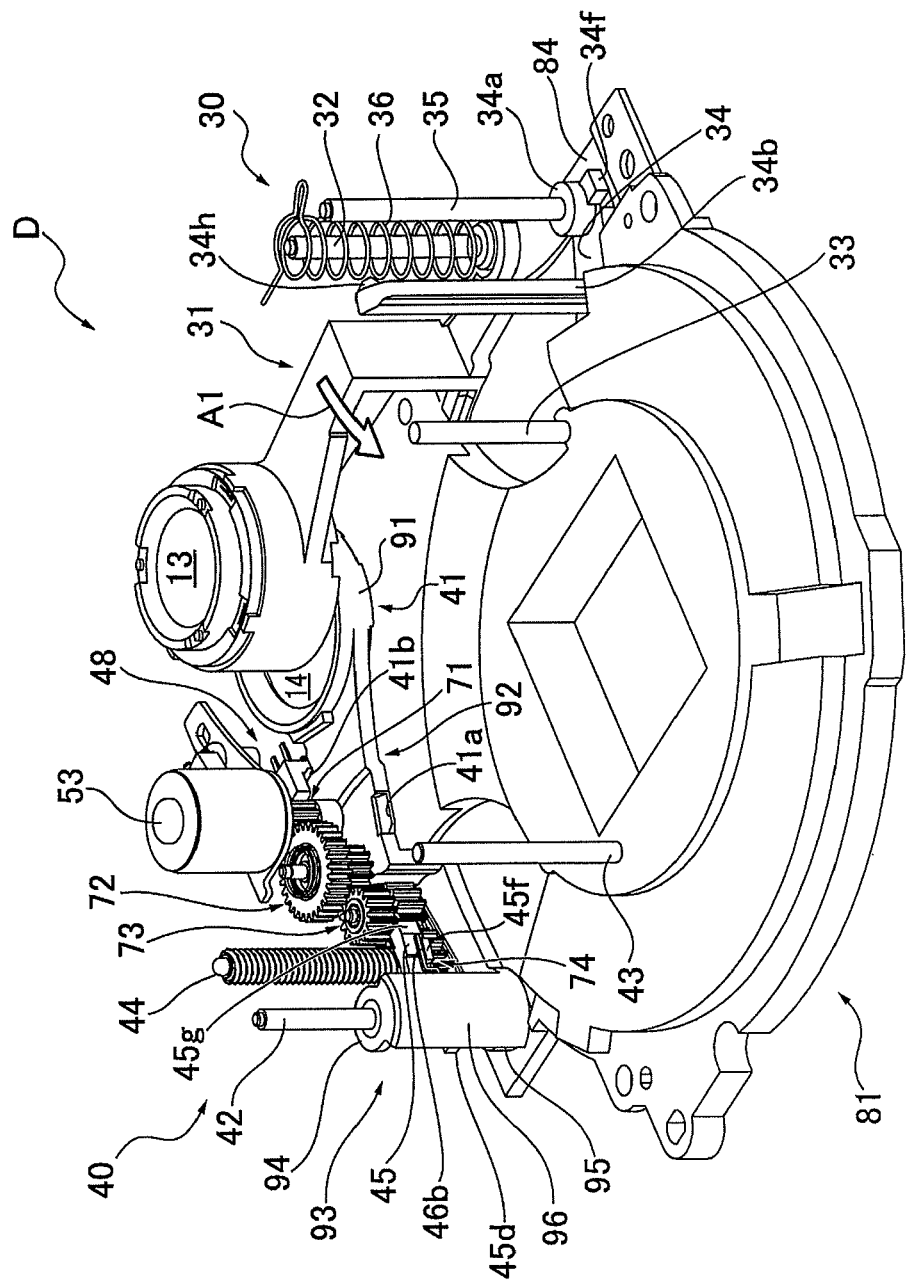
FIG. 12 is a schematic perspective view showing the collapsed stored state D for explaining configurations of a third lens retaining frame 31 and a back-and-forth drive mechanism 30 thereof as well as configurations of a fourth lens retaining frame 41 and a back-and-forth drive mechanism 40 thereof.
Figure 13:
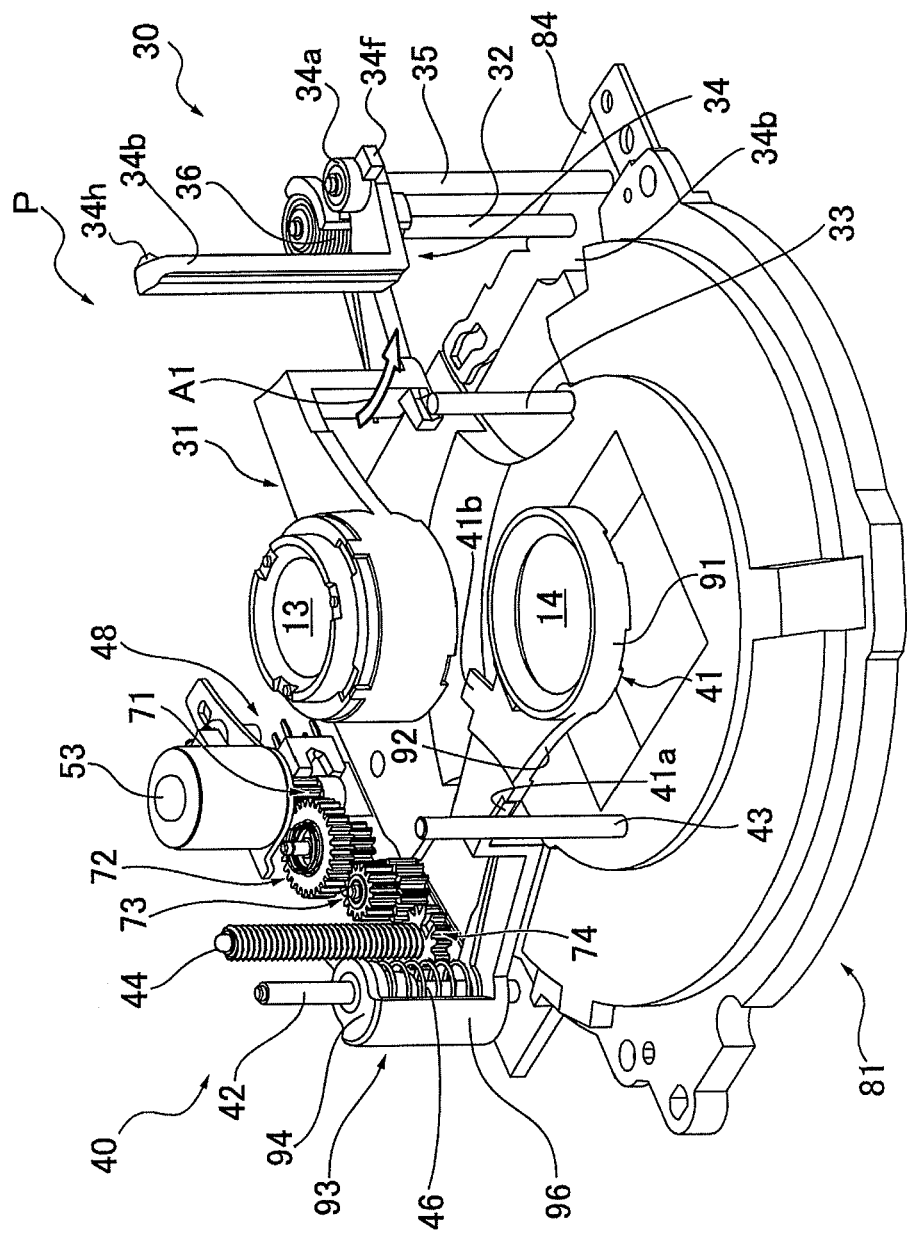
FIG. 13 is a schematic perspective view showing the photographing state P for explaining the configurations of the third lens retaining frame 31 and the back-and-forth drive mechanism 30 thereof as well as configurations of the fourth lens retaining frame 41 and the back-and-forth drive mechanism 40 thereof.

The fourth group main guide shaft 42 is provided virtually parallel to the photographic optical axis OA (photographing optical path) of the fourth lens group 14 at the position lateral to the fixed cylinder portion 21a. Moreover, the fourth group main guide shaft 42 is sandwiched between the barrel base 81 and the presser plate 82, which are fixed to the fixed frame 21 so as to be spaced apart in the photographic optical axis OA direction (see FIGS. 1 and 14). Thus, accordingly rotating the fourth lens retaining frame 41 about the fourth group main guide shaft 42 allows movement (rotational movement) thereof between the stored position where the fourth lens group 14 in the collapsed stored state is stored in the storing space 21Q of the fixed frame 21 and thus retracted out of the fixed cylinder portion 21a (the collapsed stored state D) as shown in FIGS. 2 and 12 and the photographing position where the fourth lens group 14 is inserted onto the photographic optical axis OA (photographing optical path) in the photographing state (the photographing state P) as shown in FIGS. 3 and 13. Furthermore, the fourth lens retaining frame 41, when accordingly moved along the fourth group main guide shaft 42 at the photographing position (in the photographing state P), allows the fourth lens group 14 inserted onto the photographic optical axis OA (photographing optical path) to be moved (linearly moved) on the photographic optical axis OA.

In the fourth lens retaining frame 41, a stopper 41a (see FIGS. 12 and 13) and a light-shielding piece 41b are provided so as to protrude on the fourth lens retaining portion 91 side near the bent portion of the fourth lens retaining frame arm portion 92. As shown in FIGS. 12 and 13, the stopper 41a is provided on the front side in the rotation direction from the stored position (the storing space 21Q) to the photographing position (on the photographic optical axis OA). The stopper 41a is positioned by coming into contact with the fourth group sub-guide shaft 43 so that the fourth lens group 14 retained by the fourth lens retaining frame 41 is positioned on the photographic optical axis OA (the photographing position). The fourth group sub-guide shaft 43 has a rod shape and is provided on the barrel base 81 so as to be extended in the photographic optical axis OA direction. The fourth group sub-guide shaft 43 is provided virtually parallel to the fourth group main guide shaft 42, and has a positioning function to set the fourth lens group 14 (the fourth lens retaining frame 41) at the photographing position (on the photographic optical axis OA) in cooperation with the stopper 41a and the compression torsion spring 46.

Meanwhile, the light-shielding piece 41b is formed to be extended in a plate shape so as to detect whether or not the fourth lens retaining frame 41 (the fourth lens group 14) is at the stored position. The light-shielding piece 41b is configured to shield a detection portion of a photo-interrupter 48 as a fourth group position detector from light when the fourth lens retaining frame 41 is at the stored position (retracted position) (see FIGS. 2 and 12), and to move away from the detection portion of the photo-interrupter 48 as the fourth group position detector when the fourth lens retaining frame 41 is at the photographing position (see FIGS. 3 and 13). The photo-interrupter 48 outputs an L (low-level) reference signal when the detection portion is shielded by the light-shielding piece 41b, and outputs an H (high-level) reference signal when the detection portion is not shielded by the light-shielding piece 41b. Therefore, when the L (low-level) reference signal is generated, the fourth lens retaining frame 41 may be considered to reach the stored position. This makes it possible to start an operation of retracting the third lens retaining frame 31 positioned on the object side of the fourth lens retaining frame 41 to the stored position (operation of storing the movable lens barrel). The fourth lens retaining frame 41 is rotationally and linearly moved by the driving force from the fourth group lead screw 44.

Figure 14:
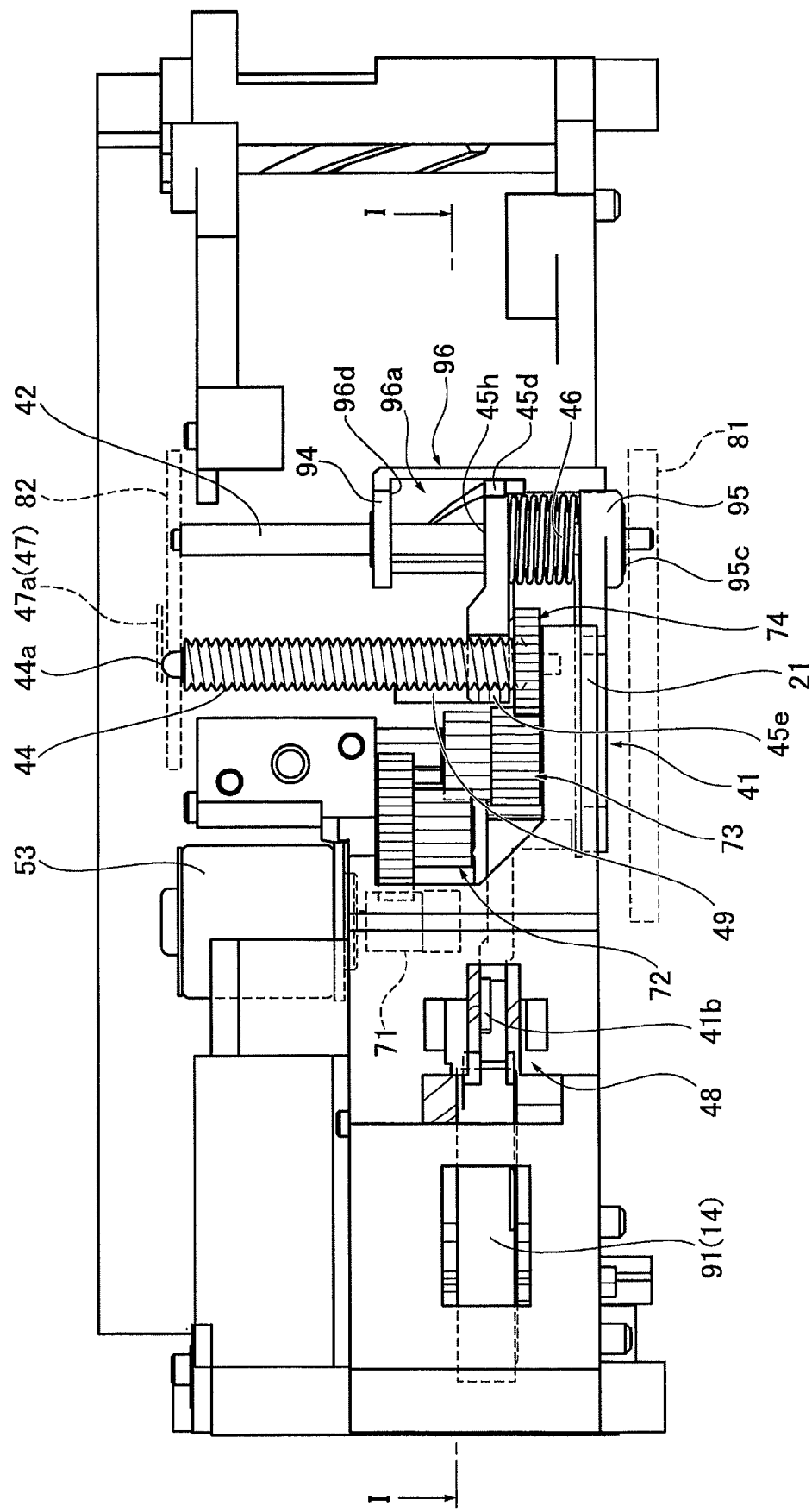
FIG. 14 is a schematic side view showing the lens barrel 10 viewed from the arrow A2 in FIG. 1.

As shown in FIGS. 14 and 17, the fourth group lead screw 44 has a rod shape having a screw groove provided on its outer peripheral surface, and has a gear 74 integrally fixed to its imaging plane side end. The fourth group lead screw 44 is rotatably sandwiched between the presser plate 82 and the fixed frame 21 so as to be virtually parallel to the photographic optical axis OA (photographing optical path) at the position lateral to the fixed cylinder portion 21a. A tip 44a of the fourth group lead screw 44 protrudes toward the object beyond the presser plate 82, and is biased toward the imaging area by an arm portion 47a of the screw biasing piece 47 (see FIG. 1). The screw biasing piece 47 is screwed with the presser plate 82 and fixed to the fixed frame 21 (see FIG. 1). For this reason, in the fourth group lead screw 44, backlash in the photographic optical axis OA direction is moved to one side. The fourth group lead screw 44 is rotationally driven when the rotary drive force from the gear 71 provided on the output shaft of the fourth group motor 53 is transmitted to the gear 74 through the gears 72 and 73. The screw member 45 is provided to transmit the rotary drive force to the fourth lens retaining frame 41.

Figure 18:
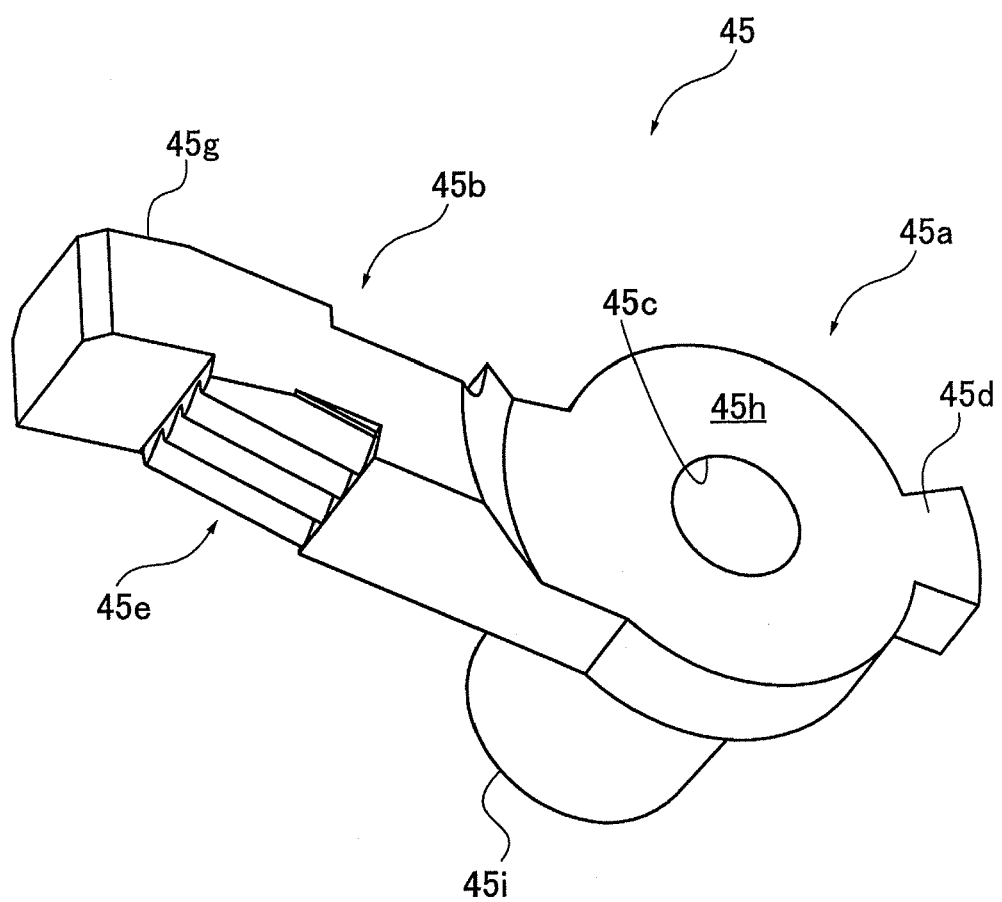
FIG. 18 is a schematic perspective view for explaining a configuration of a screw member 45.

As shown in FIG. 18, the screw member (rack) 45 has a cylindrical inserting base portion 45a and a columnar engaging leg portion 45b extended therefrom. In the inserting base portion 45a, provided are: a through-hole 45c which allows the fourth group main guide shaft 42 to be inserted thereinto while being movable to the fourth group main guide shaft 42; and a contact portion 45d protruding toward the opposite side to the engaging leg portion 45b. In the engaging leg portion 45b, provided are: a rack portion 45e with multiple teeth that can be meshed with the screw groove of the fourth group lead screw 44; an engaging protrusion 45f (see FIG. 17) for fixing an arm portion 46b on the other end of the compression torsion spring 46; and a slidable contact face 45g positioned on the side, of the engaging leg portion 45b, opposite to the rack portion 45e.

As shown in FIG. 17, the screw member 45 is provided in such a manner that the fourth group main guide shaft 42 is inserted into the insertion hole 45c while the inserting base portion 45a is positioned in a space between the front-side and rear-side shaft fitting portions 94 and 95 of the fourth lens retaining frame rotary base 93 in the fourth lens retaining frame 41 (inside of the connecting wall portion 96). Accordingly, inside of the connecting wall portion 96, the screw member 45 is supported so as to be rotatable around the fourth group main guide shaft 42 and to be movable along the fourth group main guide shaft 42. Thus, the screw member 45 is rotatable and movable relative to the fourth lens retaining frame 41. In the screw member 45, an upper end face 45h of the inserting base portion 45a faces the lower end face of the front-side shaft fitting portion 94 (the front-side engaging face 96d of the step portion 96a formed in the inner wall surface of the connecting wall portion 96 (see FIG. 16)), and the contact portion 45d is positioned inside the step portion 96a (see FIG. 14) formed in the inner wall surface of the connecting wall portion 96 (see FIG. 20). This allows the contact portion 45d of the screw member 45 to be engaged with the cam face 96b, the lateral engaging face 96c and the front-side engaging face 96d of the step portion 96a (see FIG. 16). The compression torsion spring 46 is provided below the screw member 45 (on the rear-side shaft fitting portion 95 side).

The compression torsion spring 46 is provided so as to wrap around the fourth group main guide shaft 42 in the space between the front-side and rear-side shaft fitting portions 94 and 95 of the fourth lens retaining frame 41 (inside of the connecting wall portion 96). The compression torsion spring 46 has an arm portion 46a on one end thereof and the arm portion 46b on the other end thereof. The arm portion 46a is fixed to the fourth lens retaining frame arm portion 92 of the fourth lens retaining frame 41, and the arm portion 46b is fixed to the engaging protrusion 45f of the engaging leg portion 45b of the screw member 45. With such a configuration, the compression torsion spring 46 constantly biases (hereinafter also referred to as "linearly biases") the screw member 45 in a direction from the imaging plane side (the rear-side shaft fitting portion 95 side) to the object side (the front-side shaft fitting portion 94 side) (forward (upward in FIG. 20)) on the fourth group main guide shaft 42 (in the photographic optical axis OA direction) in the space between the front-side and rear-side shaft fitting portions 94 and 95 of the fourth lens retaining frame 41 (inside of the connecting wall portion 96). At the same time, the compression torsion spring 46 constantly biases (hereinafter also referred to as "rotationally biases") the fourth lens retaining frame 41 and the screw member 45 so that the fourth lens retaining frame 41 and the screw member 45 separate from each other in the rotational direction around the fourth group main guide shaft 42. In the screw member 45 rotationally biased by the compression torsion spring 46, the rack portion 45e positioned on the front side in the rotational biasing direction is meshed with the screw groove of the fourth group lead screw 44.

The rack portion 45e of the screw member 45 can be meshed with the screw groove of the fourth group lead screw 44 as described above, and is set to be able to come into contact with the screw groove of the fourth group lead screw 44 on both of the object side (front side) and the imaging plane side (rear side) in this embodiment. With such a configuration, the rack portion 45e (the screw groove) is meshed with the fourth group lead screw 44 (the screw groove) in an appropriate state without backlash in the photographic optical axis OA direction and the direction orthogonal thereto when the screw member 45 is pressed against the fourth group lead screw 44 (the screw groove). In other words, the rack portion 45e (the screw groove) comes into contact with the screw groove of the fourth group lead screw 44 on both of the front and rear sides in the movement direction of the screw member 45 which moves along the fourth group lead screw 44 when the screw member 45 is pressed against the fourth group lead screw 44 (the screw groove). The slidable wall portion 49 (see FIG. 19) is provided to keep the meshed state.

Figure 19:
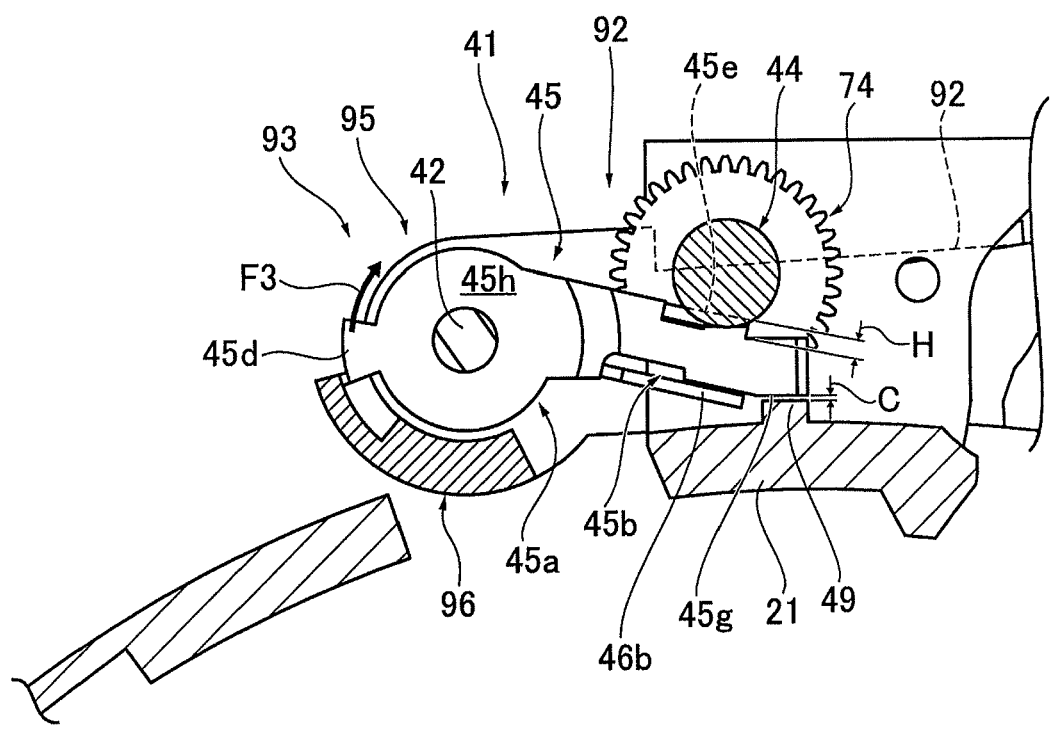
FIG. 19 is an explanatory view showing a configuration around a fourth group lead screw 44 with a cross section taken along the line I-I in FIG. 14.

As shown in FIG. 19 that is a cross-sectional view taken along the line I-I in FIG. 14, the slidable wall portion 49 is configured to face the slidable contact face 45*g* of the screw member 45 in the direction orthogonal to the photographic optical axis OA. In other words, the screw member 45 is positioned between the fourth group lead screw 44 and the slidable wall portion 49 on the plane orthogonal to the photographic optical axis OA. The slidable wall portion 49 is extended from the fixed frame 21 toward the object side in the photographic optical axis OA direction, and is set to have a length that makes it possible to face the slidable contact face 45*g* of the screw member 45 at a height position where at least a contact side portion 45*u* of the contact portion 45*d* to be described later comes into contact with the cam face 96*b* (see FIG. 14). Moreover, the slidable wall portion 49 is positioned so that a clearance C between the slidable wall portion 49 and the slidable contact face 45*g* is smaller than an engagement amount H between the rack portion 45*e* and the fourth group lead screw 44 (H>C).

Next, description is given of an operation when the back-and-forth drive mechanism 40 rotates the fourth lens retaining frame 41 thus configured between the stored position where the fourth lens group 14 is retracted out of the fixed cylinder portion 21*a* of the fixed frame 21 (the collapsed stored state D) and the photographing position where the fourth lens group 14 is inserted onto the photographic optical axis OA (the photographing state P).

Figure 20:
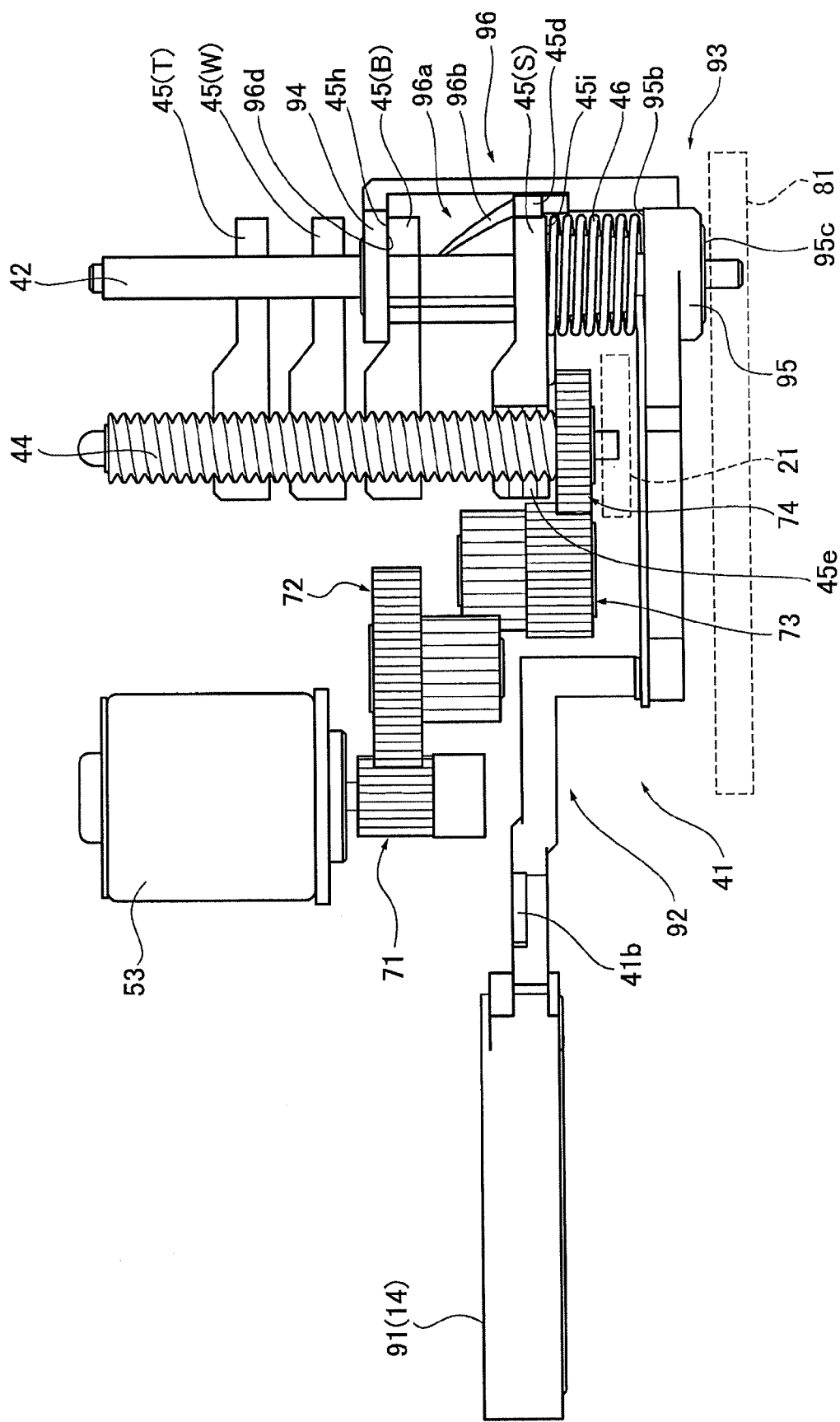
FIG. 20 is an explanatory view showing operations of the fourth lens retaining frame 41 and the back-and-forth drive mechanism 40.

In the fourth lens retaining frame 41 (the back-and-forth drive mechanism 40), the fourth lens retaining frame rotary base 93 is rotated by the pressure of the screw member 45 linearly moved in the longitudinal direction (the photographic optical axis OA direction) due to sliding of the cam face 96*b* of the step portion 96*a* provided in the cylinder inner peripheral surface and the contact portion 45*d* of the screw member 45 received therein, and is moved straight by the pressure of the screw member 45 linearly moved in the longitudinal direction due to the contact between the contact portion 45*d* and the front-side engaging face 96*d* (see FIG. 20, etc.). This allows the step portion 96*a* to function as a cam groove and the contact portion 45*d* of the screw member 45 to function as a cam pin. Accordingly, the step portion 96*a* and the contact portion 45*d* constitute a conversion mechanism for converting the movement of the screw member 45 linearly moved into rotational movement about the fourth group main guide shaft 42 and linear movement along the fourth group main guide shaft 42 in the fourth lens retaining frame 41.

As described above, the fourth lens retaining frame rotary base 93 is moved up and down along the fourth group main guide shaft 42 or rotated about the fourth group main guide shaft 42 by the contact portion 45*d* of the screw member 45 that is the cam pin moved back and forth within the step portion 96*a* that is the cam groove.

With such a configuration of the back-and-forth drive mechanism 40 of the fourth lens retaining frame 41, rotationally biasing the compression torsion spring 46 gives the fourth lens retaining frame 41 (the fourth lens retaining frame arm portion 92 thereof) fixed to the one arm portion 46*a* of the compression torsion spring 46 the rotational biasing force to make the stopper 41*a* come into contact with the fourth group sub-guide shaft 43, and also gives the screw member 45 (the engaging leg portion 45*b* thereof) fixed to the other arm portion 46*b* the rotational biasing force to mesh the rack portion 45*e* (the screw groove thereof) with the fourth group lead screw 44 (the screw groove thereof). As a result, in the step portion 96*a* of the connected wall portion 96 of the fourth lens retaining frame rotary base 93 in the fourth lens retaining frame 41, the rotational biasing force about the fourth group main guide shaft 42 is applied to the contact portion 45*d* of the screw member 45 positioned therein and moved along the photographic optical axis OA, i.e., relative rotational force is applied between the contact portion 45*d* and the step portion 96*a* (connected wall portion 96).

With such a configuration of the back-and-forth drive mechanism 40 of the fourth lens retaining frame 41, the compression torsion spring 46 interposed between the rear-side shaft fitting portion 95 (the upper end face 95*b* thereof) of the fourth lens retaining frame 41 (the fourth lens retaining frame rotary base 93 thereof) fixed to the one arm portion 46*a* of the compression torsion spring 46 and the inserting base portion 45*a* (the lower end face 45*i* thereof) of the screw member 45 fixed to the other arm portion 46*b* of the compression torsion spring 46 is compressed in the extending direction of the fourth group main guide shaft 42 (the photographic optical axis OA direction). Accordingly, with a linear biasing force of the compression torsion spring 46, the fourth lens retaining frame rotary base 93 (the upper end face 95*b* of the rear-side shaft fitting portion 95 thereof) in the fourth lens retaining frame 41 is pressed toward the imaging plane (the lower side in FIG. 16), with respect to the screw member 45 (the lower end face 45*i* of the inserting base portion 45*a* thereof) moved along the photographic optical axis OA.

As shown in FIG. 16, when the contact portion 45*d* is moved forward (toward the object side and upward in the front view) beyond the position where the cam face 96*b* does not exist (retract start position B (see FIG. 20)), the force to compress the compression torsion spring 46 no longer acts so as to narrow the interval between the one arm portion 46*a* and the other arm portion 46*b* against the rotational biasing force of the compression torsion spring 46 generated by the engagement between the contact portion 45*d* and the cam face 96*b*. For this reason, when the contact portion 45*d* is moved forward (toward the object side and upward in the front view) beyond the cam face 96*b*, the rotational biasing force of the compression torsion spring 46 allows the fourth lens group 14 retained by the fourth lens retaining frame 41 that comes into contact with the fourth group sub-guide shaft 43 by means of the stopper 41*a* to be positioned on the photographic optical axis OA (the photographing position), and also allows the rack portion 45*e* (the screw groove thereof) of the screw member 45 to be pressed against the fourth group lead screw 44 (the screw groove thereof) and properly meshed therewith.

When the contact portion 45*d* is further moved forward (wide angle position W, telephoto position T or the like of the screw member 45 (see FIG. 20)) from the position where the cam face 96*b* does not exist (retract start position B (see FIG. 20)), the upper surface of the contact portion 45*d* (the upper end face 45*h* of the screw member 45) comes into contact with the front-side engaging face 96*d*. In this event, since the fourth lens retaining frame rotary base 93 is rotationally biased relative to the contact portion 45*d* by the compression torsion spring 46, the contact portion 45*d* (the upper surface thereof) comes into contact with the front-side engaging face 96*d* at the left-side end in FIG. 20. In this state, as described above, the fourth lens group 14 is positioned on the photographic optical axis OA (see FIG. 13, etc.), and the rack portion 45*e* (the screw groove thereof) of the screw member 45 is pressed against the fourth group lead screw 44 (the screw groove thereof). Moreover, in this state, the fourth lens retaining frame rotary base 93 of the fourth lens retaining frame 41 is linearly biased toward the imaging plane (the lower side in FIG. 20) relative to the screw member 45 by the compression torsion spring 46. Accordingly, the front-side engaging face 96*d* of the connected wall portion 96 of the fourth lens retaining frame rotary base 93 (the lower end face of the front-side shaft fitting portion 94 (see FIG. 20)) is pressed against the upper end face 45*h* of the screw member 45 (see FIG. 18), thereby enabling integral movement of the screw member 45 and the fourth lens retaining frame rotary base 93 (the fourth lens retaining frame 41).

When the contact portion 45*d* is still further moved forward (wide angle position W, telephoto position T or the like of the screw member 45 (see FIG. 20)) in the above state, the contact portion 45*d* (the upper surface thereof (the upper end face 45*h* of the screw member 45)) presses the front-side engaging face 96*d* forward, thereby pushing up forward the fourth lens retaining frame rotary base 93, i.e., the fourth lens retaining frame 41. As a result, the fourth lens group 14 is accordingly moved toward the object. To be more specific, the rotational biasing force of the compression torsion spring 46 and the control of the fourth group sub-guide shaft 43 allow the fourth lens retaining frame 41 to be gradually moved from the imaging plane side to the object side while maintaining the state where the fourth lens group 14 is positioned on the photographic optical axis OA (photographic optical path).

When the contact portion 45*d* is moved backward (toward the imaging plane and downward in the front view) from the telephoto position T (see FIG. 20), the fourth lens retaining frame 41 is moved toward the barrel base 81 integrally with the contact portion 45*d* being moved. As a result, the fourth lens group 14 is accordingly moved toward the imaging plane on the photographic optical axis OA (photographing optical path). The integral movement of the contact portion 45*d* and the fourth lens retaining frame 41 is performed until the lower end face 95*c* of the rear-side shaft fitting portion 95 of the fourth lens retaining frame rotary base 93 in the fourth lens retaining frame 41 comes into contact with the barrel base 81 (the upper surface thereof) after the contact portion 45*d* is positioned at the telephoto position T.

When the contact portion 45*d* is moved backward (toward the imaging plane and downward in the front view) from the retract start position B (see FIG. 20), the lower end portion of the side of the contact portion 45*d* presses the cam face 96*b* backward by coming into contact therewith. In this state, since the forward pressing of the front-side engaging face 96*d* by the contact portion 45*d* (the upper surface thereof) is released, the linear biasing force of the compression torsion spring 46 based on the lower end face 45*i* of the contact portion 45*d* allows the base end face of the fourth lens retaining frame 41 (the lower end face 95*c* of the rear-side shaft fitting portion 95) to come into contact with the barrel base 81 (see FIG. 20). Thus, in the fourth lens retaining frame 41, according to the position (the height position in the front view of FIG. 16) of the contact portion 45*d* moved along the fourth group lead screw 44, the fourth lens retaining frame rotary base 93 is rotated against the rotational biasing force of the compression torsion spring 46 so as to follow the cam locus of the cam face 96*b* with which the contact portion 45 comes into contact. Accordingly, the fourth lens retaining frame rotary base 93, i.e., the fourth lens retaining frame 41 is set in a transition state of being rotated toward the retracted position, and the fourth lens group 14 is set in a transition state of being retracted to the retracted position from the position on the photographic optical axis OA. As described above, in the retract transition state, the conversion mechanism in which the contact portion 45*d* of the screw member 45 moved along the fourth group lead screw 44 is engaged with the cam face 96*b* of the fourth lens retaining frame 41 allows the force to narrow the interval between the one arm portion 46*a* and the other arm portion 46*b* against the rotational biasing force of the compression torsion spring 46 to act on the compression torsion spring 46.

When the contact portion 45*d* is moved backward to the stored position S, i.e., the position where the cam face 96*b* does not exist, the side of the contact portion 45*d* is pressed against the lateral engaging face 96*c* by coming into contact therewith since the fourth lens retaining frame rotary base 93 is rotationally biased. In this state, the respective positions are set so that the fourth lens group 14 is positioned in the storing space 21Q (the stored position) (see FIGS. 2 and 12, etc.). As the fourth lens retaining frame 41 approaches the storing space 21Q (the stored position) as described above, the light-shielding piece 41*b* in the fourth lens retaining frame 41 shields the detection portion of the photo-interrupter 48 as the position detector for the fourth lens group 14 (see FIGS. 2 and 12). Thus, the photo-interrupter 48 generates a reference signal from H (high level) to L (low level). The fourth lens retaining frame 41, i.e., the fourth lens group 14 is controlled for its position by a pulse count based on the reference signal from the photo-interrupter 48. The photo-interrupter 48 outputs the reference signal shifting from H to L as a storing reference signal, and the stored position S of the fourth lens retaining frame 41 is set to be a position moved toward the imaging plane by a predetermined pulse count number after the output of the storing reference signal from the photo-interrupter 48. When the screw member 45 (the contact portion 45*d*) thus reaches the stored position S, the compression torsion spring 46 is charged the most in the axial direction (linear biasing direction) as well as in the direction about the axis (rotational biasing direction).

In the lens barrel 10, as described above, the storing operation for the third lens retaining frame 31 is allowed after the storing operation for the fourth lens retaining frame 41 is completed. Next, description is given of configurations of the third lens retaining frame 31 and the back-and-forth drive mechanism 30. As shown in FIGS. 12, 13 and 21 to 29, the back-and-forth drive mechanism 30 in the third lens retaining frame 31 (the third lens group 13) includes a third group main guide shaft 32, a third group sub-guide shaft 33, a drive lever 34, a drive lever guide shaft 35, and a compression torsion spring 36 (see FIG. 2, etc.), for the third lens retaining frame 31 retaining the third lens group 13.

Figure 21:
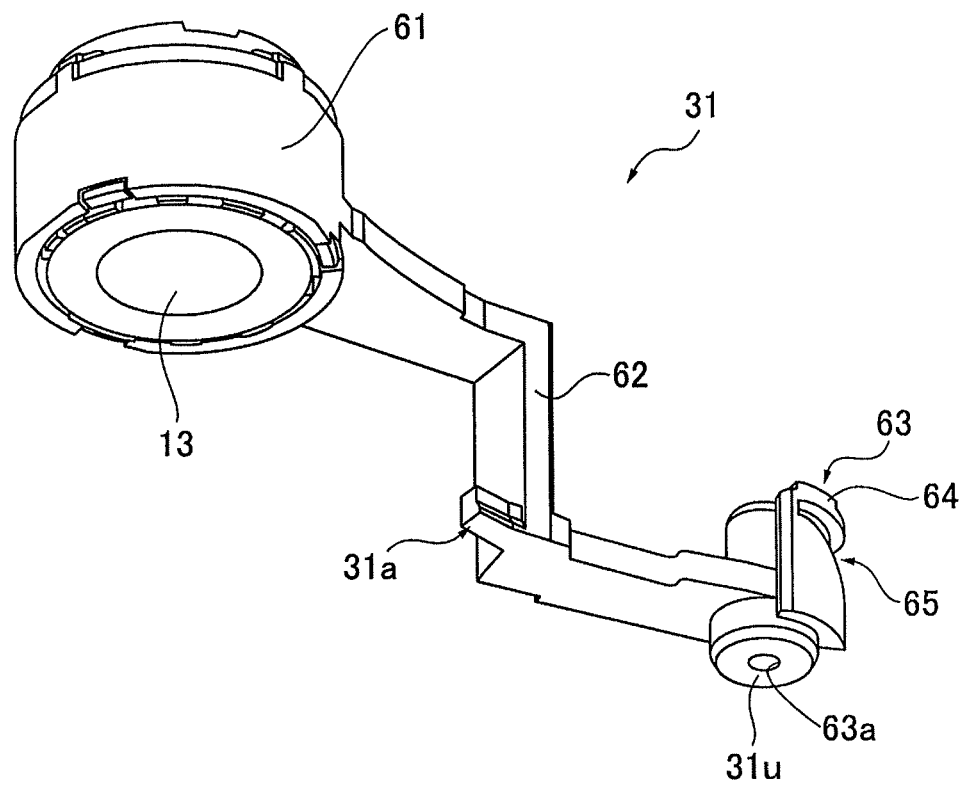
FIG. 21 is a schematic perspective view for explaining the configuration of the third lens retaining frame 31.

The third lens retaining frame 31 retains the third lens group 13 at one end, and has the other end movably and slidably inserted into the third group main guide shaft 32. As shown in FIG. 21, the third lens retaining frame 31 has a third lens retaining portion 61, a third lens retaining frame arm portion 62 and a third lens retaining frame rotary base 63.

The third lens retaining portion 61 is positioned at one end (tip) of the third lens retaining frame 31, and retains the third lens group 13. The third lens retaining portion 61 is a frame member having a cylindrical shape as a whole.

The third lens retaining frame arm portion 62 connects the third lens retaining portion 61 to the third lens retaining frame rotary base 63, and constitutes an arm portion of the third lens retaining frame 31. The third lens retaining frame arm portion 62 has a bent portion having a crank shape as a whole, which is extended parallel to the third group main guide shaft 32 at its intermediate position. The other side thereof is continuous with the third lens retaining frame rotary base 63.

The third lens retaining frame rotary base 63 has a cylindrical shape as a whole, and includes a through-hole 63*a* which allows the third group main guide shaft 32 to be inserted thereinto while being movable relative to the third group main guide shaft 32. In the third lens retaining frame rotary base 63, a curved wall portion 64 is provided, having a plate shape curved around the axis of the through-hole 63a (the third group main guide shaft 32). In the curved wall portion 64, a step portion 65 is provided, which is recessed from the cylinder outer peripheral surface. The step portion 65 includes: a cam face 65a having a cam slope shape tilted relative to the photographic optical axis OA direction on the base end side (imaging plane side); a lateral engaging face 65b continuous with a lower end of the cam face and extended in the photographic optical axis OA direction; and a front-side engaging face 65c to be a plane approximately perpendicular to the photographic optical axis OA on the subject side (see FIG. 22).

The third lens retaining frame rotary base 63 is supported by the third group main guide shaft 32 through the through-hole 63a so as to be rotatable about the axis of the third group main guide shaft 32 and to be movable in the photographic optical axis OA direction (see FIGS. 12 and 13, etc.).

The third group main guide shaft 32 is provided virtually parallel to the photographic optical axis OA (photographing optical path) of the third lens group 13 at the position lateral to the fixed cylinder portion 21a. Moreover, the third group main guide shaft 32 is sandwiched between the presser plates 83 and 84, which are fixed to the fixed frame 21 so as to be spaced apart in the photographic optical axis OA direction (see FIGS. 1 and 23). Thus, accordingly rotating the third lens retaining frame 31 about the third group main guide shaft 32 allows movement (rotational movement) thereof between the stored position where the third lens group 13 in the collapsed stored state is stored in the storing space 21Q of the fixed frame 21 and thus retracted out of the fixed cylinder portion 21a (the collapsed stored state D) as shown in FIGS. 2 and 12 and the photographing position where the third lens group 13 is inserted onto the photographic optical axis OA (photographing optical path) in the photographing state (the photographing state P) as shown in FIGS. 3 and 13. Furthermore, the third lens retaining frame 31, when accordingly moved along the third group main guide shaft 32 at the photographing position (in the photographing state P), allows the third lens group 13 inserted onto the photographic optical axis OA (photographing optical path) to be moved (linearly moved) on the photographic optical axis OA.

In the third lens retaining frame 31, a stopper 31a (see FIG. 21) is provided on the third lens retaining portion 61 side near the bent portion of the third lens retaining frame arm portion 62. As shown in FIGS. 12 and 13, the stopper 31a is provided on the front side in the rotation direction from the stored position (the storing space 21Q) to the photographing position (on the photographic optical axis OA). The stopper 31a is positioned by coming into contact with the third group sub-guide shaft 33 so that the third lens group 13 retained by the third lens retaining frame 31 is positioned on the photographic optical axis OA (the photographing position). The third group sub-guide shaft 33 has a rod shape and is provided on the barrel base 81 so as to be extended in the photographic optical axis OA direction. The third group sub-guide shaft 33 is provided virtually parallel to the third group main guide shaft 32, and has a positioning function to set the third lens group 13 (the third lens retaining frame 31) at the photographing position (on the photographic optical axis OA) in cooperation with the stopper 31a and the compression torsion spring 36.

The compression torsion spring 36 is provided so as to wrap around the third group main guide shaft 32 between the third lens retaining frame rotary base 63 of the third lens retaining frame 31 and the presser plate 83. The compression torsion spring 36 has an arm portion 36a on one end thereof and an arm portion 36b on the other end thereof. The arm portion 36a is fixed to the third lens retaining frame arm portion 62 of the third lens retaining frame 31, and the arm portion 36b is fixed to the presser plate 83. With such a configuration, the compression torsion spring 36 constantly biases (hereinafter also referred to as "linearly biases") the third lens retaining frame 31 (the third lens retaining frame rotary base 63) in a direction from the object side (the presser plate 83) to the imaging plane side (the presser plate 84) (backward (downward in FIG. 23)) on the third group main guide shaft 32 (in the photographic optical axis OA direction). At the same time, the compression torsion spring 36 constantly biases (hereinafter also referred to as "rotationally biases") the third lens retaining frame 31 in a direction from the stored position to the position on the photographic optical axis OA (the photographing position (photographing state P)) in the rotational direction around the third group main guide shaft 32. The rotational biasing direction in the third lens retaining frame rotary base 63 is indicated by the arrow A1 in FIGS. 12 and 13. Accordingly, the compression torsion spring 36 function as cylinder biasing means for applying biasing force to the third lens retaining frame rotary base 63 as a rotary cylinder constituting a rotary base of the third lens retaining frame 31 that is the retractable lens retaining frame.

Figure 23:
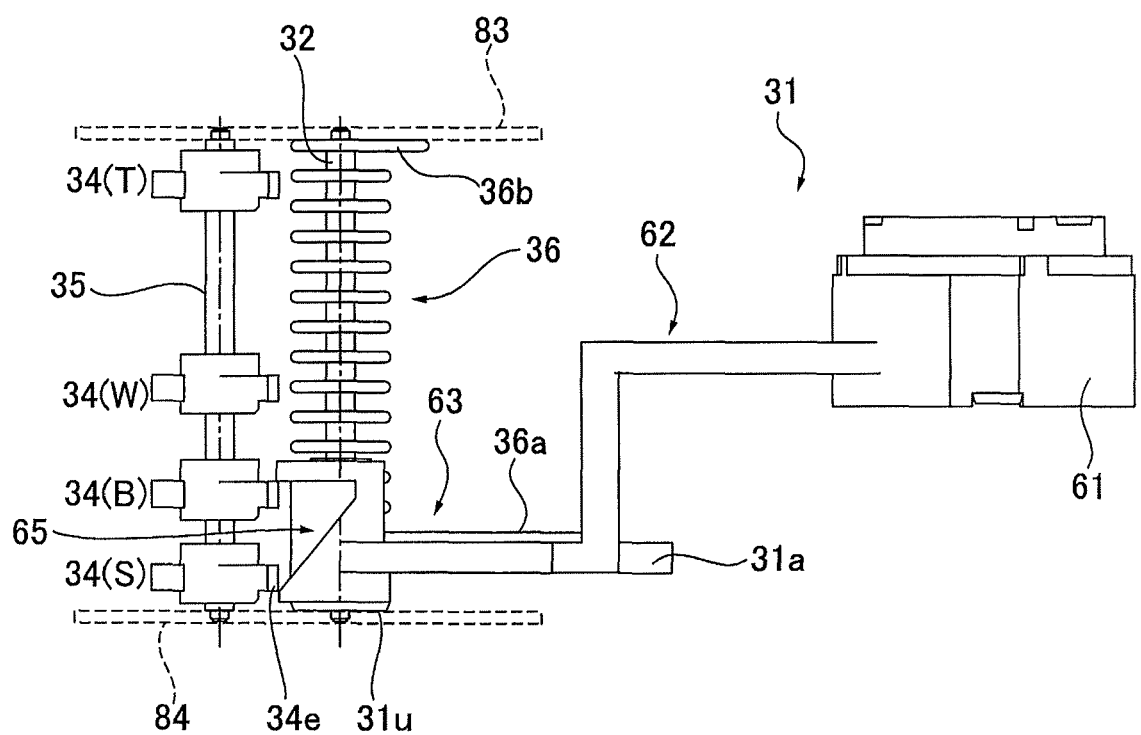
FIG. 23 is an explanatory view showing operations of the third lens retaining frame 31 and the back-and-forth drive mechanism 30.

The drive lever guide shaft 35 is provided virtually parallel to the photographic optical axis OA (photographing optical path) between the presser plates 83 and 84, as shown in FIGS. 1 and 23, at the position lateral to the fixed cylinder portion 21a. Moreover, the drive lever guide shaft 35 is arranged parallel to the third group main guide shaft 32. The drive lever 34 is provided in the drive lever guide shaft 35.

Figure 24A:
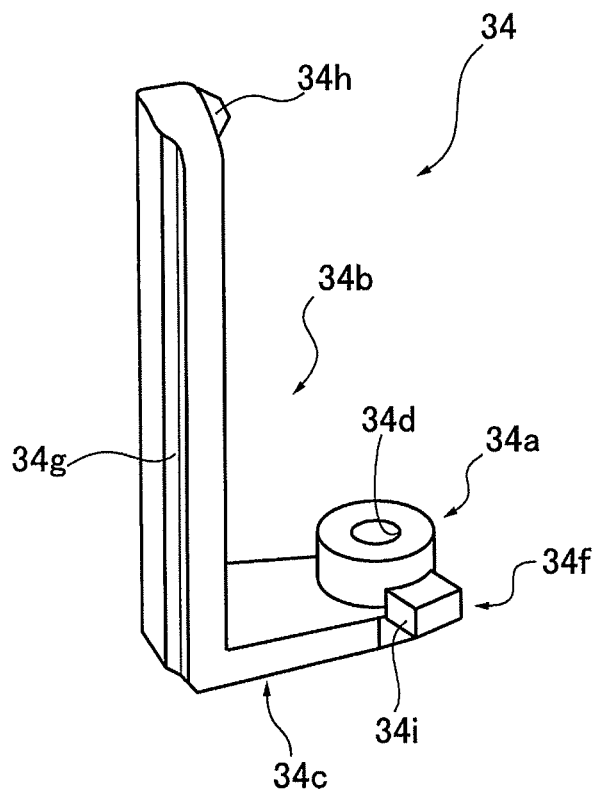
FIGS. 24A and 24B are schematic perspective views for explaining the configuration of the drive lever 34, FIG. 24A showing how the lever looks from the side facing the photographic optical axis OA, and FIG. 24B showing how the lever looks from a drive lever guide shaft 35 side.
Figure 24B:
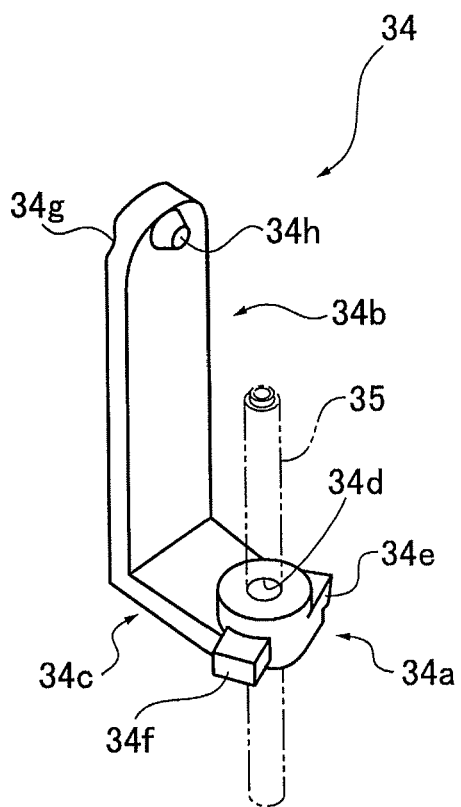

The drive lever 34 is moved with the movement of the first rotary cylinder 22 relative to the fixed cylinder portion 21a, and is a drive member for moving the third lens retaining frame 31 as the retractable lens retaining frame between the photographing position and the retracted position. As shown in FIG. 24, the drive lever 34 includes: a columnar insertion base portion 34a; an extended portion 34b extended in the axial direction; and a bridge portion 34c connecting the insertion base portion 34a and the extended portion 34b. In the insertion base portion 34a, provided are: a through-hole 34d which allows the drive lever guide shaft 35 to be inserted thereinto while being movable relative to the drive lever guide shaft 35; a contact portion 34e protruding in a direction different from that of the extended portion 34b; and an engaging protrusion portion 34f protruding in a direction opposite to the contact portion 34e.

The extended portion 34b has a plate shape extended in the photographic optical axis OA direction in a state where the drive lever guide shaft 35 is inserted into the insertion base portion 34a. The extended portion 34b is set to have a size so that it can be slidably fitted into the second straight groove 23f in the first liner 23 so as to fill up the second straight groove 23f (see FIG. 11). In other words, the extended portion 34b and the second straight groove 23f are engageable with each other in the circumferential direction of the first liner 23, and are movable relative to each other in the photographic optical axis OA direction.

Figure 25:
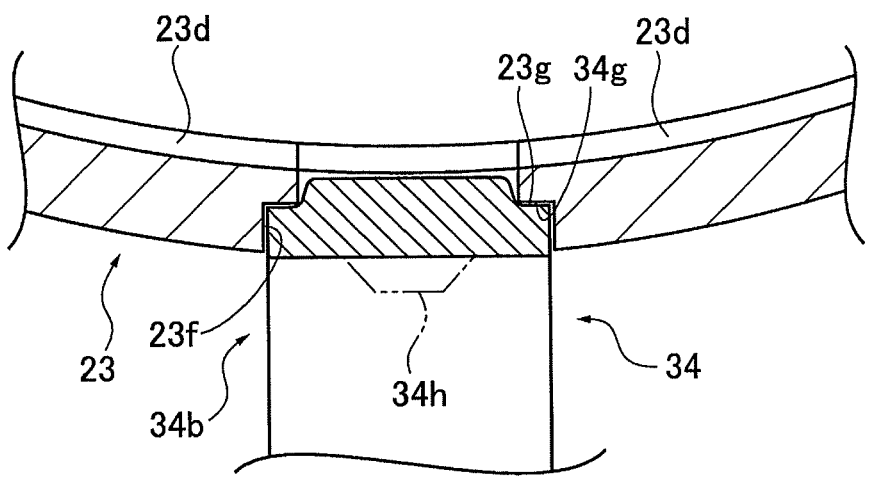
FIG. 25 is an explanatory view showing the configuration of the drive lever 34 and a second straight groove 23f with a cross section taken along the line II-II in FIG. 11.

The extended portion 34b has a step portion 34g provided in an edge of a surface on the photographic optical axis OA side (surface facing opposite to the insertion base portion 34a). The step portion 34g corresponds to the step portion 23g of the second straight groove 23f in the first liner 23. Thus, as shown in FIG. 25, when the extended portion 34b (extended end portion) is fitted into the second straight groove 23f, its circumferential movement within the second straight groove 23f is prevented. At the same time, the engagement between the step portion 34g and the step portion 23g prevents the extended portion 34b from being moved from the outside to the inside in a radial direction.

The cam protrusion 34h is provided near the tip of the extended portion 34b (at one end of the drive lever 34). The cam protrusion 34h protrudes outward in the radial direction (toward the insertion base portion 34a) from the surface of the extended portion 34b. The cam protrusion 34h can be engaged with the cam groove 22e (see FIGS. 5 and 10) provided in the inner peripheral surface of the first rotary cylinder 22, and is slidable within the cam groove 22e in a state where the first liner 23 having the extended portion 34b fitted into the second straight groove 23f (see FIGS. 11 and 28) is disposed inside the first rotary cylinder 22. To be more specific, the cam protrusion 34h functions as a cam follower for the cam groove 22e. The cam protrusion 34h may be formed integrally with the extended portion 34b, i.e., the drive lever 34, or may be attached separately to the extended portion 34b.

In the drive lever 34, as shown in FIGS. 12 and 13, the drive lever guide shaft 35 is provided being inserted into the through-hole 34d of the insertion base portion 34a. Accordingly, the drive lever 34 is supported so as to be rotatable about the drive lever guide shaft 35 and to be movable along the drive lever guide shaft 35. Moreover, as described above, since the drive lever 34 has the extended portion 34b fitted into the second straight groove 23f in the first liner 23 as described above (see FIG. 11, etc.), the drive lever 34 is prevented from being moved in the circumferential direction of the first liner 23 and from being moved from the outside to the inside in the radial direction of the first liner 23 (see FIG. 25). This allows the drive lever 34 to be moved only in the photographic optical axis OA direction that is the extending direction of the drive lever guide shaft 35 and the extending direction of the second straight groove 23f in the first liner 23. In this state, the contact portion 34e provided at the other end of the drive lever 34 is positioned in the step portion 65 of the curved wall portion 64 of the third lens retaining frame rotary base 63 (see FIG. 23, etc.). This allows the contact portion 34e of the drive lever 34 to be engaged with the cam face 65a, lateral engaging face 65b and front-side engaging face 65c of the step portion 65 (see FIG. 22). The engaging protrusion portion 34f (see FIG. 24) is provided to maintain the engagement state.

The engaging protrusion portion 34f can be engaged with an engaging recessed portion 21e (see FIGS. 2 and 3) provided in the fixed frame 21 in a state where the drive lever 34 is supported by the drive lever guide shaft 35 and the extended portion 34b is fitted into the second straight groove 23f in the first liner 23. When the drive lever 34 approaches the presser plate 84 on the drive lever guide shaft 35, the engaging recessed portion 21e defines an engaging face 21f (see FIG. 3) facing one side face 34i of the engaging protrusion portion 34f (see FIG. 24A) in the rotational direction about the d rive lever guide shaft 35. Accordingly, the engaging protrusion portion 34f can be engaged with the engaging recessed portion 21e by making the one side face 34i come into contact with the engaging face 21f in the state where the drive lever 34 is positioned close to the presser plate 84 on the drive lever guide shaft 35.

Next, description is given of an operation in which the back-and-forth drive mechanism 30 rotates the third lens retaining frame 31 thus configured between the stored position where the third lens group 13 is retracted out of the fixed cylinder portion 21a of the fixed frame 21 (the collapsed stored state D) and the photographing position where the third lens group 13 is inserted onto the photographic optical axis OA (the photographing state P).

In the third lens retaining frame 31 (the back-and-forth drive mechanism 30), the third lens retaining frame rotary base 63 is rotated by the pressure of the drive lever 34 linearly moved in the longitudinal direction due to sliding of the cam face 65a of the step portion 65 provided in the cylinder outer peripheral surface and the contact portion 34e of the drive lever 34 received therein, and is moved straight by the pressure of the drive lever 34 linearly moved in the longitudinal direction due to the contact between the contact portion 34e and the front-side engaging face 65c. This allows the step portion 65 to function as a cam groove and the contact portion 34e of the drive lever 34 to function as a cam pin. Accordingly, the step portion 65 and the contact portion 34e constitute a conversion mechanism for converting the movement of the linearly moved drive lever 34 into rotational movement about the third group main guide shaft 32 and linear movement along the third group main guide shaft 32 in the third lens retaining frame 31.

Figure 26:
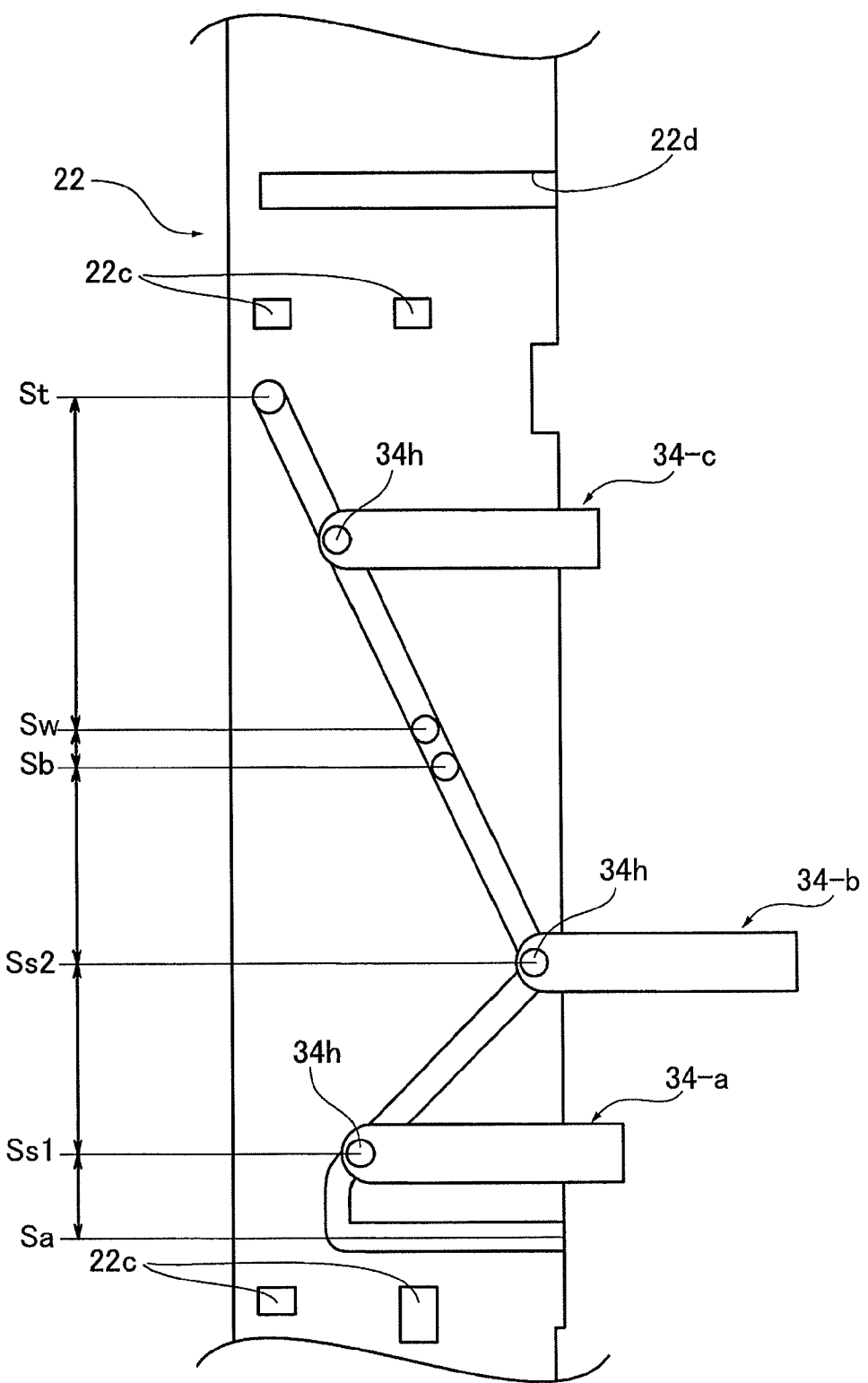
FIG. 26 is an enlarged explanatory view showing an area around the cam groove 22e in FIG. 10 where the inner peripheral surface of the first rotary cylinder 22 is expanded.
Figure 27A:
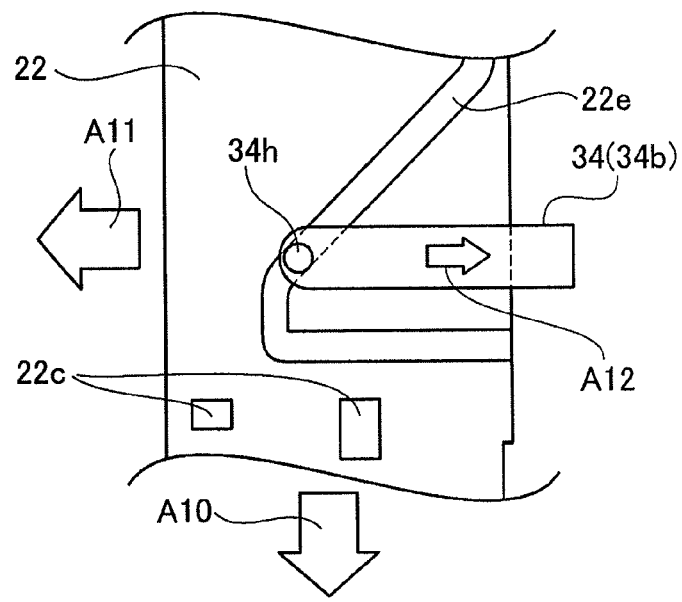
FIGS. 27A to 27C are explanatory views showing how the first rotary cylinder 22 is rotated and moved back and forth when viewed from the drive lever 34 (the extended portion 34b) assuming that the horizontal direction in the front view is the photographic optical axis OA direction, the left side is the subject side, and the vertical direction in the front view is the rotational direction of the first rotary cylinder 22 relative to the drive lever 34, i.e., the first liner 23, FIG. 27A showing the stored state (the collapsed stored state D) where the first rotary cylinder 22 is collapsed into the fixed cylinder portion 21a, FIG. 27B showing that the first rotary cylinder 22 is completely extended to the maximum extended position relative to the fixed cylinder portion 21a, and FIG. 27C showing that the first rotary cylinder 22 is rotated at the maximum extended position.
Figure 27B:
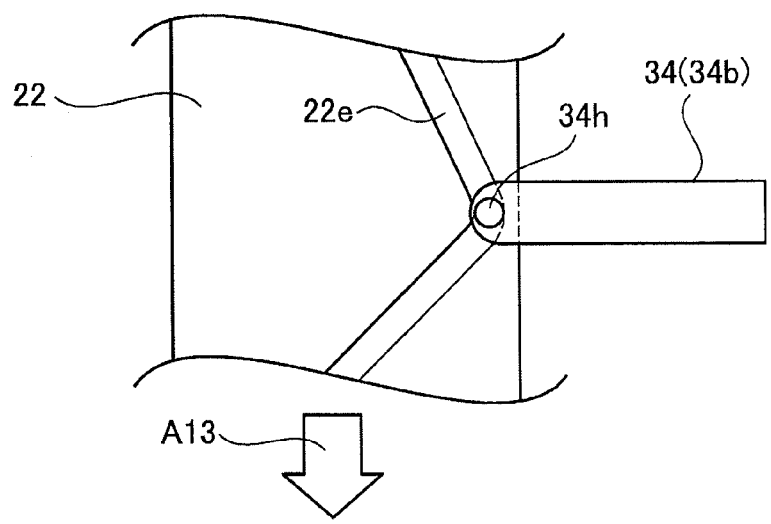
Figure 27C:
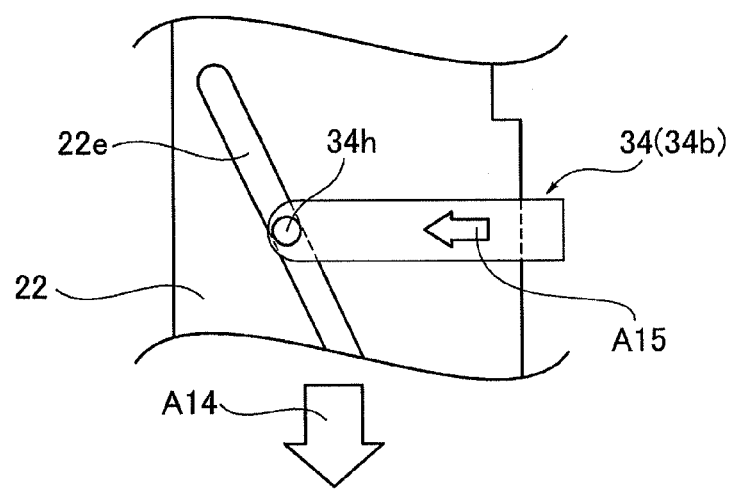

The drive lever 34 is moved relative to the first liner 23 linearly in the longitudinal direction due to sliding of the cam protrusion 34h and the cam groove 22e in the first rotary cylinder 22 (see FIGS. 5 and 10). First, the linear movement of the drive lever 34 is described with reference to FIGS. 26 and 27. FIG. 26 is an enlarged explanatory view of an area around the cam groove 22e in FIG. 10, showing the expanded inner peripheral surface of the first rotary cylinder 22. FIG. 26 also shows how the drive lever 34 (the extended portion 34b) is moved when viewed from the first rotary cylinder 22. FIGS. 27A to 27C show how the first rotary cylinder 22 is rotated and moved back and forth when viewed from the drive lever 34 (the extended portion 34b), and are each set to have, when viewed from the front, the horizontal direction as the photographic optical axis OA direction, the left side as the subject side, and the vertical direction as the rotational direction of the first rotary cylinder 22 relative to the drive lever 34, i.e., the first liner 23. FIG. 27A shows that the first rotary cylinder 22 is collapsed in the fixed cylinder portion 21a in the stored state (the collapsed stored state D). FIG. 27B shows that the first rotary cylinder 22 is completely extended to the maximum extended position relative to the fixed cylinder portion 21a. FIG. 27C shows that the first rotary cylinder 22 is rotated at the maximum extended position. Note that, in FIG. 26, reference numeral 34-a denotes the drive lever in FIG. 27A, reference numeral 34-b denotes the drive lever in FIG. 27B, and reference numeral 34-c denotes the drive lever in FIG. 27C.

As described above, in the lens barrel 10, the first rotary cylinder 22 is fitted into the fixed cylinder portion 21a of the fixed frame 21, and the first liner 23 is fitted into the first rotary cylinder 22 (see FIG. 4, etc.). In this state, the drive lever 34 has the extended portion 34b fitted into the second straight groove 23f in the first liner 23 (see FIG. 11, etc.), the cam protrusion 34h provided in the extended portion 34b is fitted into the cam groove 22e in the first rotary cylinder 22 (see FIG. 5, etc.), and the insertion base portion 34a is slidably supported on the drive lever guide shaft 35 (see FIG. 12, etc.). In the lens barrel 10, when the zoom motor 51 is driven in the stored position (collapsed stored state D), the rotational drive force is transmitted to the first rotary cylinder 22 through the gear portion 22b (see FIG. 5). Accordingly, the first rotary cylinder 22 is rotated and driven relative to the fixed cylinder portion 21a, and thus is extended toward the subject side according to the position of the cam follower 22a (see FIG. 5) within the cam groove 21c (see FIG. 9). In this event, the first liner 23 is integrally moved relative to the first rotary cylinder 22 in the photographic optical axis OA (photographing optical path) direction as described above, and is not rotated about the photographic optical axis OA relative to the fixed cylinder portion 21a unlike the first rotary cylinder 22.

For this reason, when viewed from the drive lever 34 (the extended portion 34b), the engagement position of the cam protrusion 34h with the cam groove 22c (see FIG. 5, etc.) is changed depending on the rotational posture of the first rotary cylinder 22. The drive lever 34 (the extended portion 34b), when viewed from the first rotary cylinder 22, is moved in the photographic optical axis OA direction while maintaining the posture along the photographic optical axis OA in accordance with the engagement position of the cam protrusion 34h with the cam groove 22e (see FIG. 26). The cam groove 22e, as shown in FIG. 26, has the lower end (reference numeral Sa) opened to the image plane side (right side) and extended in the photographic optical axis OA direction. After that, the cam groove is extended upward and then extended obliquely upward to the image plane side again (from Ss1 to Ss2). Thereafter, the cam groove is extended obliquely upward to the subject side (left side) (from Ss2 to St through Sb and Sw). Accordingly, in the drive lever 34 (the extended portion 34b), the engagement position of the cam protrusion 34h is moved relative to the first rotary cylinder 22 toward the image plane between Ss1 and Ss2, and is moved relative to the first rotary cylinder 22 toward the subject between Ss2 and St.

As to the cam groove 22e, between Ss1 and Ss2, the inclination angle relative to the photographic optical axis OA direction and the rotation angle around the photographic optical axis OA on the plane orthogonal to the photographic optical axis OA are equal to those of the portion (see FIG. 9) of the cam groove 21c in the fixed cylinder portion 21a, which is inclined relative to the photographic optical axis OA direction. Note that the portion of the cam groove 22e between Sa and Ss1 serves as a spot for inserting the cam protrusion 34h of the drive lever 34 into the cam groove 22e in assembly of the lens barrel 10.

Here, in the lens barrel 10, since the first rotary cylinder 22 is rotatable relative to the fixed cylinder portion 21a but the first liner 23 is not rotatable relative to the fixed cylinder portion 21a, the position of the drive lever 34 is constant in the circumferential direction (rotation direction) regardless of the rotation of the first rotary cylinder 22. When viewed from the drive lever 34 (the extended portion 34b), the cam groove 22e is moved around the photographic optical axis OA along with the rotation of the first rotary cylinder 22.

When the first rotary cylinder 22 is in the collapsed stored state D, as shown in FIG. 27A, the drive lever 34 (the extended portion 34b) is located at the position closest to the image plane side (rightmost position). This position is the stored position S (see FIG. 23) of the drive lever 34.

Figure 28:
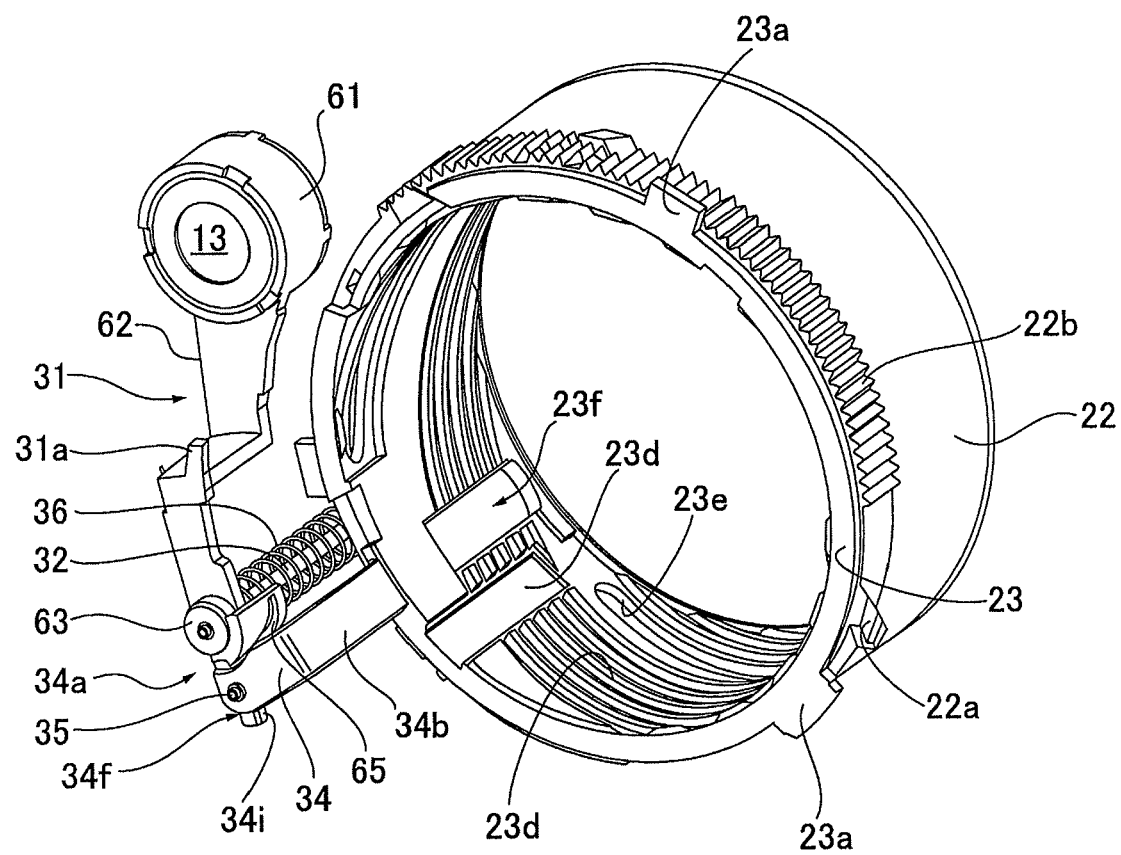
FIG. 28 is a schematic perspective view showing that the drive lever 34 (the extended portion 34b) protrudes toward the image plane when the first liner 23 having the extended portion 34b fitted into the second straight groove 23f is disposed inside the first rotary cylinder 22.

When the first rotary cylinder 22 is rotated from the collapsed stored state D (see the arrow A10), the first rotary cylinder 22 is advanced toward the subject according to the rotational posture thereof (see the arrow A11). In this event, the drive lever 34 (the extended portion 34b) is moved relative to the first rotary cylinder toward the image plane 22 by the guide action caused by the engagement between the cam protrusion 34h and the cam groove 22e (see the arrow A12). This causes the drive lever 34 (the extended portion 34b) to protrude on the image plane side as shown in FIG. 28 when viewed from the first rotary cylinder 22 and the first liner 23. In this event, as described above, the inclination angle of the cam groove 22e between Ss1 and Ss2 is equal to that of the inclined portion (see FIG. 9) of the cam groove 21c in the fixed cylinder portion 21a. Thus, the first rotary cylinder 22 is only advanced toward the subject (see the arrow A11) when viewed from the fixed cylinder portion 21a (the fixed frame 21), and the position of the drive lever 34 viewed from the photographic optical axis OA direction is not changed (see FIGS. 27A and 27B). In other words, when the first rotary cylinder 22 is moved relative to the fixed cylinder portion 21a in the photographic optical axis OA direction forward or backward, the cam mechanism (the cam groove 22c and the cam protrusion 34h) moves the drive lever 34 relative to the first rotary cylinder 22 in the direction opposite to the forward or backward movement direction by the same distance as the forward or backward movement amount.

Furthermore, when the first rotary cylinder 22 is rotated (see the arrow A13), the first rotary cylinder 22 is advanced to the maximum extended position as shown in FIG. 27B. In this event, as described above, the rotation angle between Ss1 and Ss2 of the cam groove 22e is assumed to be equal to that of the inclined portion (see FIG. 9) of the cam groove 21c in the fixed cylinder portion 21a. Thus, the position of the drive lever 34 in the photographic optical axis OA direction when viewed from the fixed cylinder portion 21a is not changed. To be more specific, the drive lever 34 is kept from moving relative to the fixed cylinder both in the photographic optical axis OA direction and in the rotational direction until the first rotary cylinder 22 reaches the maximum extended position from the collapsed stored state D.

When the first rotary cylinder 22 is further rotated (see the arrow A14), as shown in FIG. 27C, the first rotary cylinder 22 is rotated relative to the fixed cylinder portion 21a while maintaining the maximum extended position, i.e., while fixing the position relative to the fixed cylinder portion 21a in the photographic optical axis OA direction. Then, the cam protrusion 34h of the drive lever 34 (the extended portion 34b) slides between Ss2 and St of the cam groove 22e. Accordingly, the drive lever 34 (the extended portion 34b) is moved to the position closest to the subject (leftmost position) relative to the first rotary cylinder 22 as well as to the fixed cylinder portion 21a. The position, of the drive lever 34 (the extended portion 34b), closest to the subject (leftmost position) is the telephoto position T (see FIG. 23) of the drive lever 34.

The cam groove 22e and the cam protrusion 34h thus constitute a cam structure for converting the rotation of the first rotary cylinder 22 into the movement of the drive lever 34 along the drive lever guide shaft 35, i.e., the movement thereof in the photographic optical axis OA direction. The movement of the drive lever 34 in the photographic optical axis OA direction changes the position of the contact portion 34e of the drive lever 34 in the photographic optical axis OA direction within the step portion 65 of the curved wall portion 64 of the third lens retaining frame rotary base 63.

As described above, the third lens retaining frame rotary base 63, i.e., the third lens retaining frame 31 is moved up and down along the third group main guide shaft 32 or rotated about the third group main guide shaft 32 by the contact portion 34e of the drive lever 34 that is the cam pin moved in the longitudinal direction within the step portion 65 as the cam groove. Next, description is given of a movement of the third lens retaining frame rotary base 63 relative to the position of the contact portion 34e within the step portion 65 as the cam groove.

Figure 22:
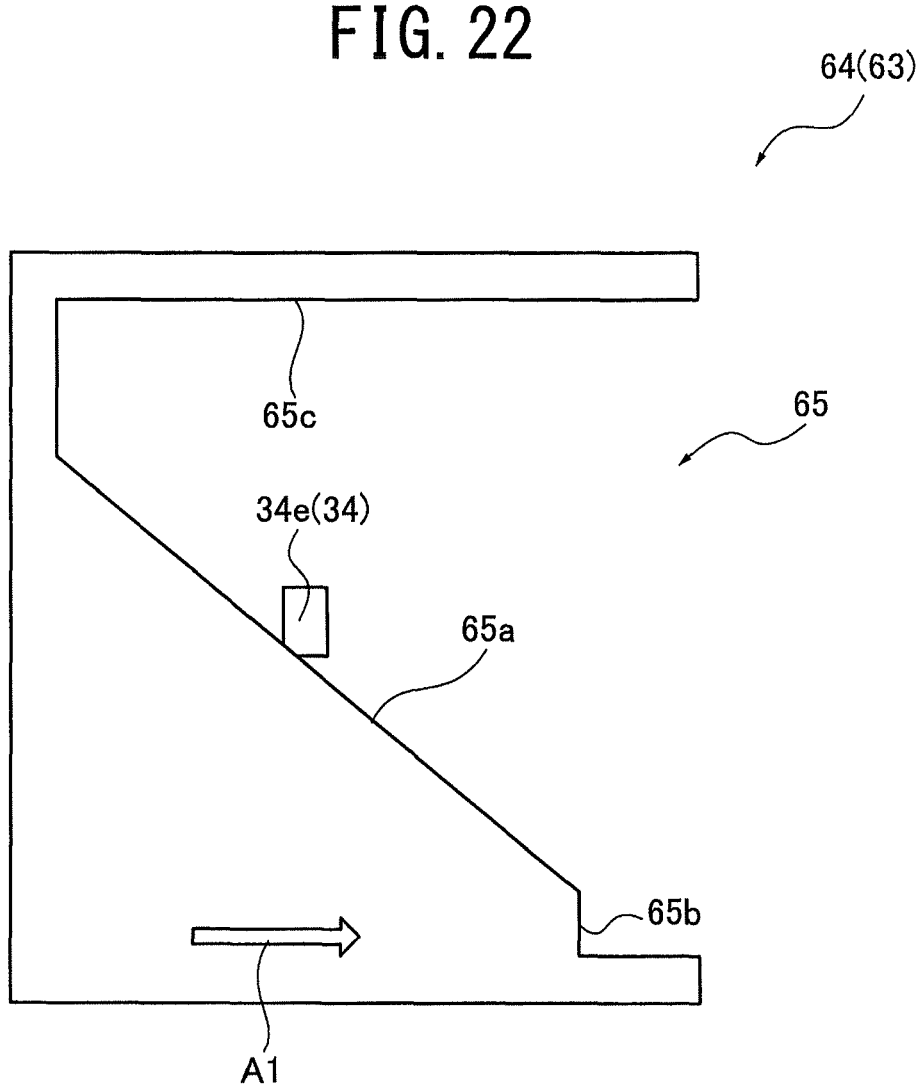
FIG. 22 is an explanatory view showing a step portion 65 of a third lens retaining frame rotary base 63 in the third lens retaining frame 31.

When the drive lever 34 is in the retract start position B (see FIG. 23), the contact portion 34e is moved forward (toward the object and upward in the front view) up to the position where the cam face 65a does not exist, and the upper surface thereof comes into contact with the front-side engaging face 65c (see FIG. 22). In this event, since the third lens retaining frame rotary base 63 is linearly biased toward the image plane (toward the presser plate 84) in the photographic optical axis OA direction, the base end face 31*u* of the third lens retaining frame 31 comes into contact with the presser plate 84 (see FIG. 23). Moreover, since the third lens retaining frame rotary base 63 is rotationally biased (see the arrow A1 in FIG. 22), the stopper 31*a* of the third lens retaining frame 31 is engaged with the third group sub-guide shaft 33 to set the third lens group 13 at the photographing position (photographing state P) on the photographic optical axis OA (see FIGS. 3 and 13, etc.).

When the drive lever 34 is further moved forward in the above state (the wide angle position W or the telephoto position T, etc. (see FIG. 23)), the contact portion 34*e* pushes the front-side engaging face 65*c* forward and pushes the third lens retaining frame rotary base 63 forward against the linear biasing force (see FIG. 22), thereby accordingly moving the third lens group 13 toward the object. In this event, since the third lens retaining frame rotary base 63 is rotationally biased toward the position on the photographic optical axis OA (see the arrow A1 in FIG. 13), the position on the photographic optical axis OA controlled by the third group sub-guide shaft 33 is maintained. Accordingly, in the conversion mechanism described above, the contact portion 34*e* and the front-side engaging face 65*c* constitute a linear movement portion (conversion mechanism linear movement portion) for converting the movement of the drive lever 34 into linear movement of the third lens retaining frame 31 along the third group main guide shaft 32. Note that, when the drive lever 34 (the extended portion 34*b*) reaches the telephoto position T, the compression torsion spring 36 is charged the most in the axial direction (linear biasing direction).

When the drive lever 34 is moved backward (toward the image plane and downward in the front view) from the retract start position B (see FIG. 23), the lower left end portion (contact side portion) of the contact portion 34*e* comes into contact with the cam face 65*a* and pushes backward the cam face 65*a*, i.e., the third lens retaining frame rotary base 63 (see FIG. 22). In this event, since the contact portion 34*e* does not push forward the third lens retaining frame rotary base 63 through the front-side engaging face 65*c*, the linear biasing force of the compression torsion spring 36 makes the base end face 31*u* of the third lens retaining frame 31 come into contact with the presser plate 84 (see FIG. 23). Accordingly, the third lens retaining frame rotary base 63 is rotated (moved to the left in FIG. 22) against the rotational biasing force (see the arrow A1 in FIG. 22) according to the contact (pressure) position of the contact portion 34*e* in the cam face 65*a*. Thus, the third lens retaining frame 31 becomes a transition state of being rotated so that the stopper 31*a* is separated from the third group sub-guide shaft 33 and the third lens group 13 is moved from the photographing position (photographing state P) on the photographic optical axis OA to the retracted position. Accordingly, in the conversion mechanism described above, the contact portion 34*e* and the cam face 65*a* constitute a rotating portion (conversion mechanism rotating portion) for converting the movement of the drive lever 34 into rotational movement of the third lens retaining frame 31 about the third group main guide shaft 32.

When the drive lever 34 is moved backward (toward the image plane and downward in the front view) to the stored position S (see FIG. 23), the contact portion 34*e* is moved backward up to the position where the cam face 65*a* does not exist, and the third lens retaining frame rotary base 63 is rotationally biased (see the arrow A1 in FIG. 22). As a result, the side face of the contact portion 34*e* comes into contact with the lateral engaging face 65*b*, and the both faces press against each other. In this event, the third lens retaining frame rotary base 63, i.e., the third lens retaining frame 31 becomes a retracted stored state that is a rotational posture as a stored position (retracted position) where the third lens group 13 is stored in the storing space 21Q in the fixed frame 21 as a retracted position, and thus retracted out of the fixed cylinder portion 21*a*. When the drive lever 34 (the contact portion 34*e*) reaches the stored position S as described above, the compression torsion spring 36 is charged the most in the axial direction (rotational biasing direction).

As described above, in the lens barrel 10, the zoom motor 51 is driven to shift the first lens group 11, the second lens group 12 and the shutter/aperture unit 15 between the stored position (collapsed stored state D) and the photographing position (photographing state P), and to perform a predetermined zooming operation. In conjunction with such a movement, the third lens group 13 is shifted between the retracted position (collapsed stored state D) and the photographing position (photographing state P), and performs a predetermined zooming operation.

Figure 29A:
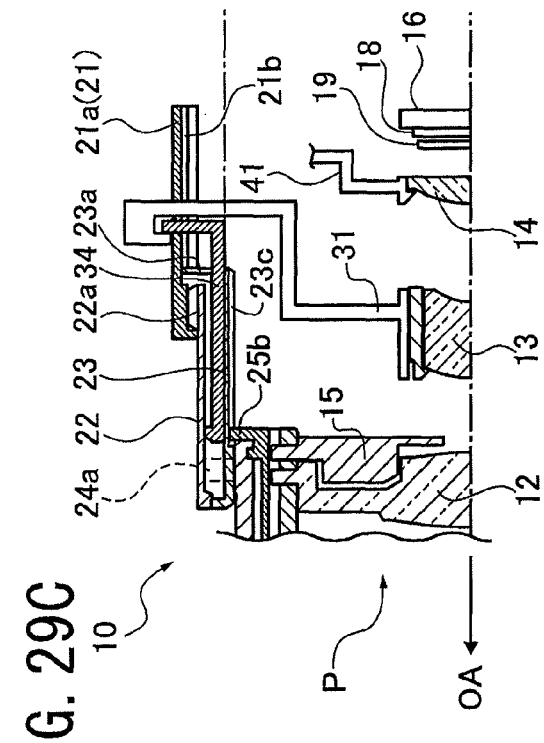
FIGS. 29A to 29D are explanatory views showing the operational modes of the lens barrel 10 with cross sections as in FIG. 4, FIG. 29A showing the collapsed stored state D, FIG. 29B showing that the first rotary cylinder 22 is moved to the maximum extended position, FIG. 29C showing that the third lens group 13 is moved to the photographing position (photographing state P) on the photographic optical axis OA, and FIG. 29D showing that the third lens group 13 is moved to a telephoto position.

Specifically, when the first rotary cylinder 22 is in the collapsed stored state D, the cam protrusion 34*h* of the drive lever 34 is engaged with the position of Ss1 (see FIG. 26) of the cam groove 22*e* in the first rotary cylinder 22, thereby setting the drive lever 34 in the stored position S (see FIG. 23). Thus, as shown in FIG. 29A, the third lens group 13 is stored in the retracted position (the storing space 21Q) which is retracted out of the fixed cylinder portion 21*a* from the photographic optical axis OA.

Figure 29C:
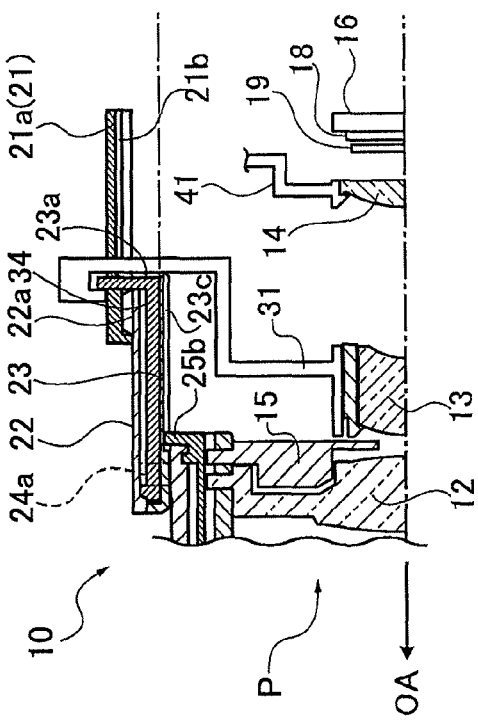
Figure 29B:
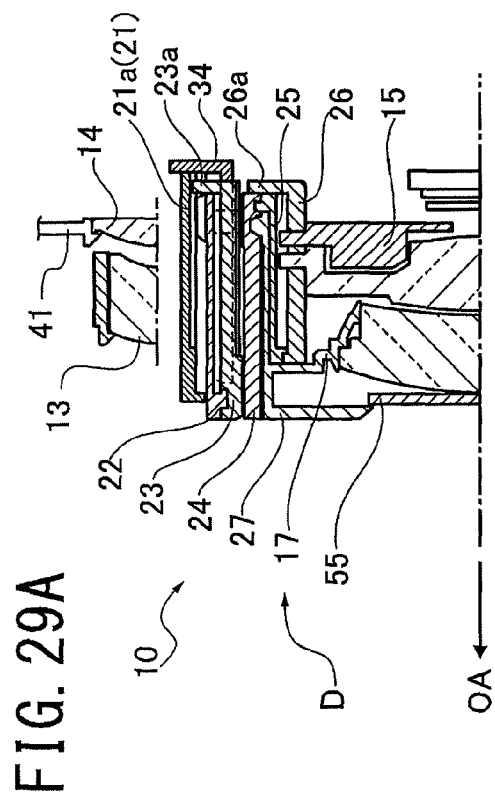

When the first rotary cylinder 22 is advanced to the maximum extended position from the collapsed stored state D, the cam protrusion 34*h* of the drive lever 34 slides to the position of Ss2 from the position of Ss1 of the cam groove 22*e* (see FIG. 26) in the first rotary cylinder 22. Accordingly, as shown in FIGS. 29A and 29B, the drive lever 34 is not moved from the stored position S (see FIG. 23), thereby maintaining the third lens group 13 in a state of being stored in the retracted position (the storing space 21Q). Thus, the interval between Ss1 and Ss2 of the cam groove 22*e* is a stored position maintaining section for storing the third lens group 13 (the third lens retaining frame 31) in the retracted position.

When the first rotary cylinder 22 is further rotated at the maximum extended position, the cam protrusion 34*h* of the drive lever 34 slides from the position Ss2 to the position Sb (see FIG. 26) of the cam groove 22*e* in the first rotary cylinder 22, and the drive lever 34 is moved from the stored position S to the retract start position B (see FIG. 23). Thus, as shown in FIGS. 29B and 29C, the third lens group 13 is moved from the retracted position (the storing space 21Q) to the photographing position (photographing state P) on the photographic optical axis OA (see FIGS. 3 and 13, etc.). As a result, the interval between Ss2 and Sb of the cam groove 22*e* is a rotational posture control section for controlling the rotational posture of the third lens retaining frame 31.

Figure 29D:
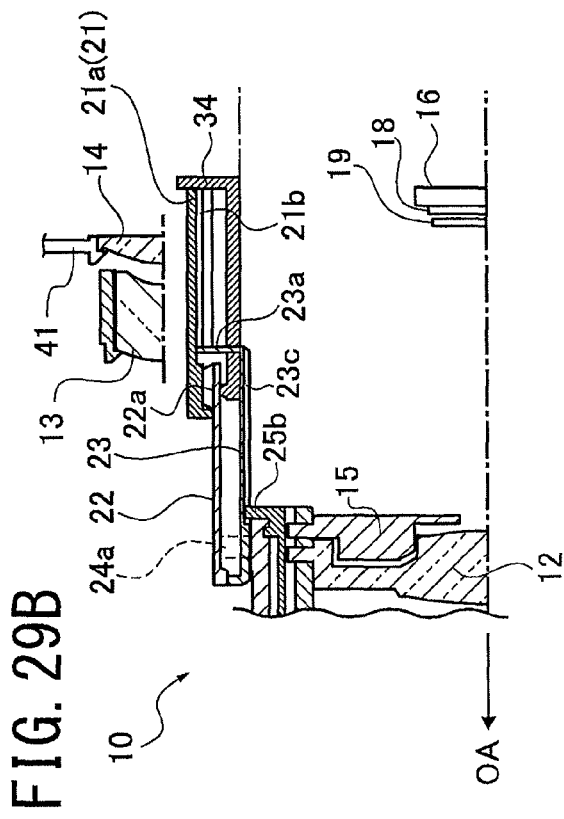

When the first rotary cylinder 22 is further rotated at the maximum extended position, the cam protrusion 34*h* of the drive lever 34 slides from the position Sb to the position St through Sw (see FIG. 26) of the cam groove 22*e* in the first rotary cylinder 22, and the drive lever 34 is moved from the retract start position B to the telephoto position T through the wide angle position W (see FIG. 23). Thus, as shown in FIGS. 29C and 29D, the third lens group 13 is moved to the telephoto position through the wide angle position on the photographic optical axis OA (see FIGS. 3 and 13, etc.). As a result, the interval between Sb and St of the cam groove 22*e* is an on-optical-axis position control section for controlling the position (the wide angle position W, the telephoto position T or the like (see FIG. 23)) of the third lens retaining frame 31, i.e., the third lens group 13 when viewed from the photographic optical axis OA direction.

Note that the movements described above can be reversed by driving the zoom motor 51 to rotate the first rotary cylinder 22 in opposite direction.

Figure 30A:
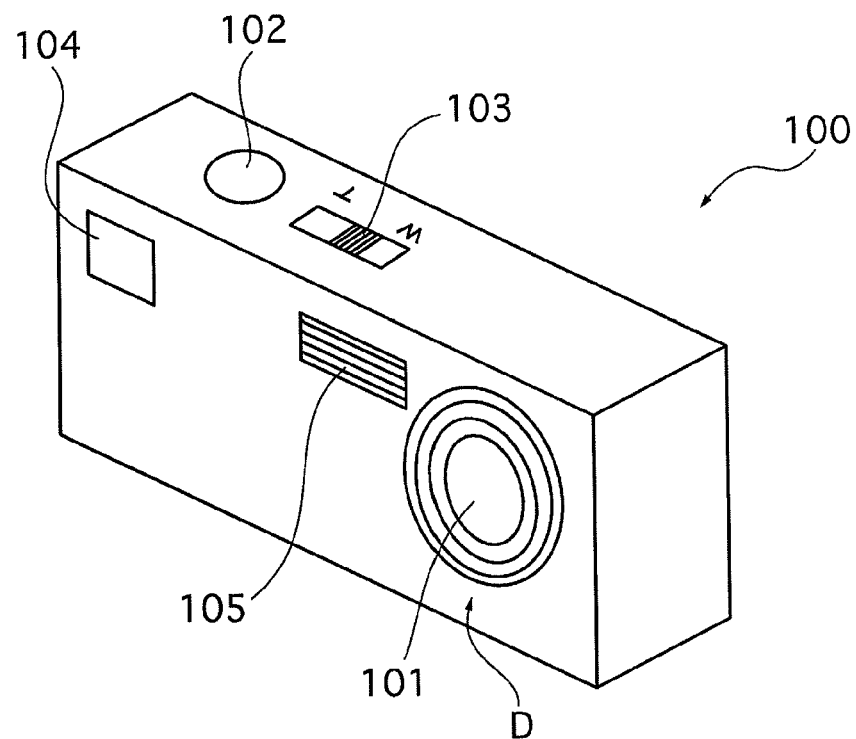
FIGS. 30A and 30B are schematic perspective views showing an external configuration of a camera 100 using the lens barrel 10 of the present invention when viewed from the object side, FIG. 30A showing that a photographing lens is collapsed and stored in a body of the camera, and FIG. 30B showing that the photographing lens protrudes from the body of the camera.
Figure 30B:
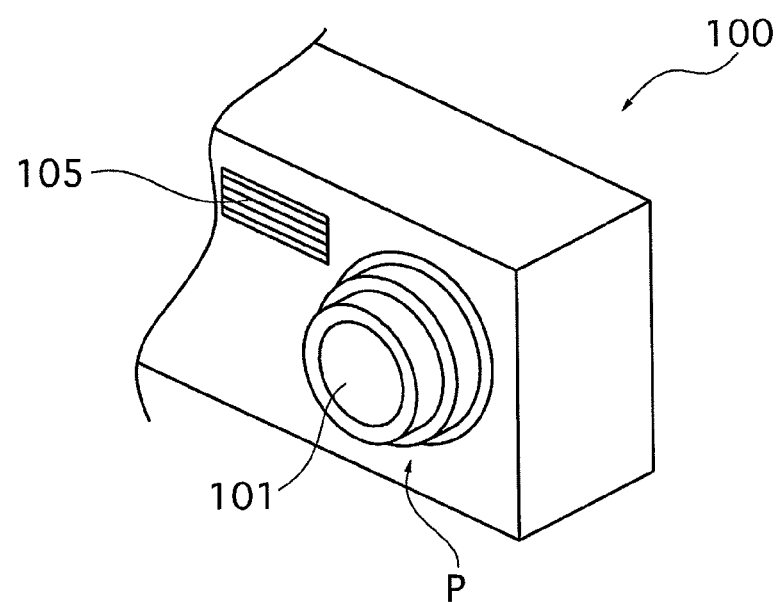
Figure 31:
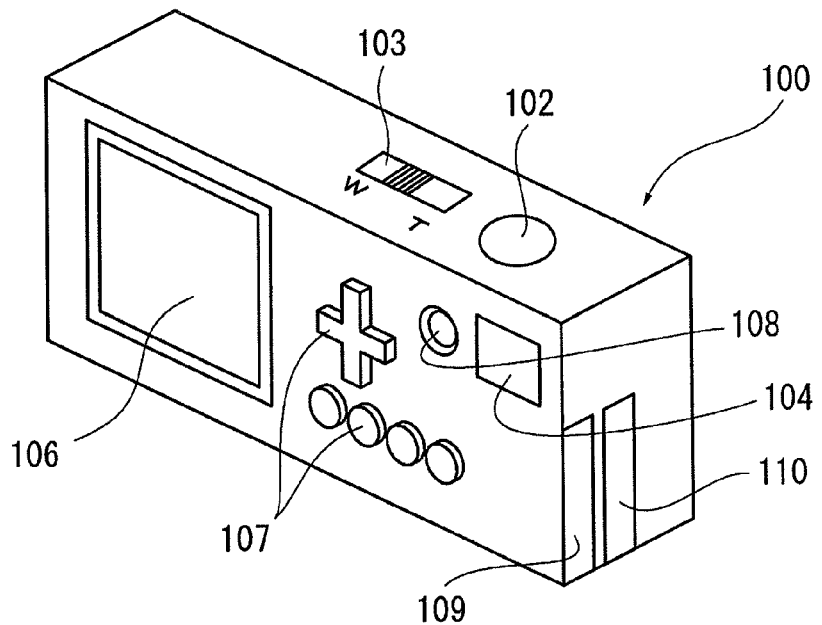
FIG. 31 is a schematic perspective view showing an external appearance of the camera 100 when viewed from the back that is the side where a photographer is present.
Figure 32:
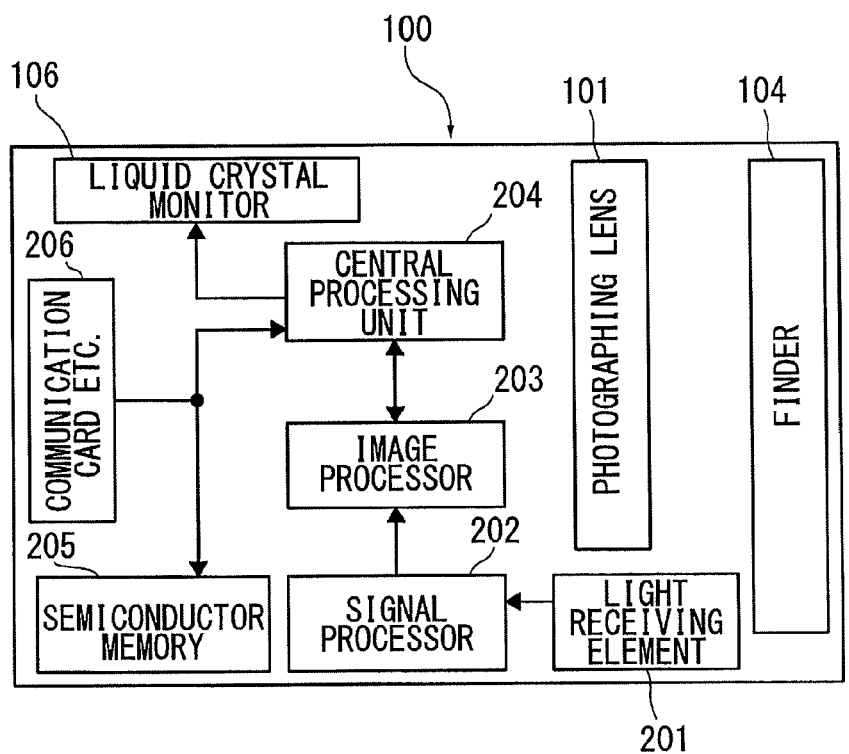
FIG. 32 is a block diagram showing a functional configuration of the camera 100.

Next, with reference to FIGS. 30 to 32, description is given of an example where a camera (imaging apparatus) 100 is configured by adopting an optical apparatus including the lens barrel 10 described in the above embodiment as a photographing optical system. FIG. 30 is an external perspective view of the camera 100 when viewed from the front that is the side where an object, i.e., a subject is present. FIG. 31 is an external perspective view of the camera 100 when viewed from the back that is the side where a photographer is present. FIG. 32 is a block diagram showing a functional configuration of the camera 100. Note that although the camera 100 is described here, there have recently been appearing portable information terminals with a camera function, such as a PDA (personal data assistant) and a portable telephone.

Many of such portable information terminals have virtually the same functions and configurations as the camera 100 despite a slight difference in appearance. Thus, the optical apparatus including the lens barrel 10 according to the present invention may be applied to such a portable information terminal. Similarly, the optical apparatus including the lens barrel 10 according to the present invention may be applied to an image input apparatus.

As shown in FIGS. 30 and 31, the camera 100 includes a photographing lens 101, a shutter button 102, a zoom lever 103, a finder 104, a strobe 105, a liquid crystal monitor 106, operation buttons 107, a power switch 108, a memory card slot 109, a communication card slot 110, and the like. As shown in FIG. 32, the camera 100 further includes a light receiving element 201, a signal processor 202, an image processor 203, a central processing unit (CPU) 204, a semiconductor memory 205, and communication card etc. 206. Although not explicitly shown, the above respective components are operated by a battery as a drive power source feeding power thereto.

The camera 100 has the photographing lens 101 and the light receiving element 201 as an area sensor such as a CCD (charge-coupled device) imaging device. The camera is configured so that the light receiving element 201 reads an image of the object to be photographed, i.e., the subject, which is formed by the photographing lens 101 as the photographing optical system. As the photographing lens 101, the optical apparatus including the lens barrel 10 according to the present invention as described in the embodiment is used. To be more specific, the lenses as optical elements constituting the lens barrel 10 are used to configure the optical apparatus (e.g., the solid-state imaging device 16 (see FIG. 4) is used to configure the light receiving element 201). The lens barrel 10 has a mechanism to retain the respective lenses and the like so that the lenses are operated to be moved at least by lens group. The photographing lens 101 included in the camera 100 is normally built in the form of the optical apparatus.

The output of the light receiving element 201 is processed by the signal processor 202 controlled by the central processing unit 204, and is then converted into digital image information. The image information digitized by the signal processor 202 is subjected to predetermined image processing by the image processor 203 controlled again by the central processing unit 204, and is then stored in the semiconductor memory 205 such as a nonvolatile memory. In this case, the semiconductor memory 205 may be a memory card loaded in the memory card slot 109 or may be a semiconductor memory built into the camera main body. The liquid crystal monitor 106 can display an image that is being photographed as well as an image recorded in the semiconductor memory 205. The images recorded in the semiconductor memory 205 can also be transmitted to the outside through the communication card etc. 206 loaded in the communication card slot 110.

The photographing lens 101 is buried in the body of the camera 100 in a collapsed state as shown in FIG. 30A when the camera 100 is carried. The photographing lens 101 is configured so that when a user operates the power switch 108, the power is turned on, the lens barrel is extended as shown in FIG. 30B, and the photographing lens protrudes from the body of the camera 100 to be set in the photographing state P. In this event, inside the lens barrel 10 of the photographing lens 101, optical systems of the respective groups constituting a zoom lens are disposed in wide angle positions, for example, and the arrangement of the group optical systems is changed by operating the zoom lever 103, thereby enabling an operation of changing the magnifying power to a telephoto end.

It is preferable that the optical system of the finder 104 also changes the power in conjunction with a change in angle of view of the photographing lens 101.

In many cases, focusing is performed by pressing the shutter button 102 halfway. The focusing of the zoom lens in this embodiment can be performed mostly by moving the fourth lens group 14. When the shutter button 102 is further pressed to achieve a full press state, photographing is performed, and then the processing as described above is performed.

To display the images recorded in the semiconductor memory 205 on the liquid crystal monitor 106 or to transmit the images to the outside through the communication card etc. 206, the operation buttons 107 are operated in a predetermined manner. The semiconductor memory 205 and the communication card etc. 206 are used by being loaded into dedicated or general-purpose slots such as the memory card slot 109 and the communication card slot 110.

Note that when the photographing lens 101 is in the collapsed state, the third lens group 13 and the fourth lens group 14 are retracted from the photographic optical axis OA (photographic optical path), and are stored in parallel with the first lens group 11 and the second lens group 12 (see FIGS. 2 and 4). Thus, further reduction in thickness of the camera 100 can be realized.

In the lens barrel 10 of this embodiment, the back-and-forth drive mechanism 30 as the retracting frame drive mechanism for the third lens retaining frame 31 as the retractable lens retaining frame is operated by the drive force of the zoom motor as the back-and-forth drive source for moving the movable lens barrel relative to the fixed cylinder portion 21a (fixed frame 21) back and forth in the photographic optical axis OA direction. Therefore, there is no need to provide a retracting frame drive source only for the back-and-forth drive mechanism 30 (retracting frame drive mechanism). This enables the lens barrel to have a smaller configuration, thereby contributing to further miniaturization.

Moreover, in the lens barrel 10 of this embodiment, the back-and-forth drive mechanism 30 as the retracting frame drive mechanism utilizes the operation of the movable lens barrel by the zoom motor 51 as the back-and-forth drive source, i.e., the rotation of the first rotary cylinder 22 to operate the third lens retaining frame 31 as the retractable lens retaining frame. Thus, there is no need to change the basic configurations of the movable lens barrel and the zoom motor 51, thereby enabling a simple configuration.

Furthermore, in the lens barrel 10 of this embodiment, the single zoom motor 51 serves as the back-and-forth drive source for moving the movable lens barrel back and forth in the photographic optical axis OA direction as well as the retracting frame drive source for the back-and-forth drive mechanism 30 of the third lens retaining frame 31. Thus, compared with the case where the back-and-forth drive source and the retracting frame drive source are separately provided, operation noise can be reduced, which is caused when the first lens group 11, the second lens group 12, the third lens group 13 and the shutter/aperture unit 15 are moved between the stored position (collapsed stored state D) and the photographing position (photographing state P) or the zooming operation thereof is performed.

In the lens barrel 10 of this embodiment, since the single zoom motor 51 serves as the back-and-forth drive source and the retracting frame drive source, power consumption, manufacturing cost and running cost can be suppressed.

In the lens barrel 10 of this embodiment, since the drive lever 34 (the extended portion 34b thereof) as the drive member is disposed in the fixed cylinder portion 21a, the drive lever 34 can be moved with a simple configuration by utilizing the movement of the movable lens barrel (the first rotary cylinder 22 in this example) relative to the fixed cylinder portion 21a. This enables the lens barrel to have a smaller configuration, thereby contributing to further miniaturization.

In the lens barrel 10 of this embodiment, the drive lever 34 (the extended portion 34b thereof) is fitted into and supported by the second straight groove 23f in the first liner 23 which is not rotated relative to the fixed cylinder portion 21a, i.e., the fixed frame 21. Accordingly, the movement of the first rotary cylinder 22 in the rotational direction can be controlled with a simple configuration while allowing the movement of the drive lever 34 along the drive lever guide shaft 35, i.e., the movement thereof in the photographic optical axis OA direction. This enables the lens barrel to have a smaller configuration, thereby contributing to further miniaturization.

In the lens barrel 10 of this embodiment, the cam protrusion 34h of the extended portion 34b of the drive lever 34 that can be moved only in the photographic optical axis OA direction and the cam groove 22e in the first rotary cylinder 22 rotated relative to the fixed cylinder portion 21a constitute the cam structure for converting the rotation of the first rotary cylinder 22 into the movement of the drive lever 34 along the drive lever guide shaft 35, i.e., the movement thereof in the photographic optical axis OA direction. Thus, the drive lever 34 can be moved in the photographic optical axis OA direction with a simple configuration. This enables the lens barrel to have a smaller configuration, thereby contributing to further miniaturization.

In the lens barrel 10 of this embodiment, the step portion 65 of the third lens retaining frame rotary base 63 and the contact portion 34e of the drive lever 34 constitute the conversion mechanism for converting the movement of the linearly moved drive lever 34 into the rotational movement of the third lens retaining frame 31 about the third group main guide shaft 32 and the linear movement thereof along the third group main guide shaft 32. Thus, the third lens retaining frame 31 can be operated with a simple configuration. This enables the lens barrel to have a smaller configuration, thereby contributing to further miniaturization.

In the lens barrel 10 of this embodiment, the drive lever 34 is provided so as to be movable in the photographic optical axis OA direction while bridging the inside and outside of the fixed cylinder portion 21a. Moreover, the extended portion 34b on the one end thereof is connected to the first rotary cylinder 22 by the cam structure, and the insertion base portion 34a on the other end thereof is connected to the third lens retaining frame 31 by the conversion mechanism. Thus, the third lens retaining frame 31 can be rotationally and linearly moved by moving the first rotary cylinder 22 relative to the fixed cylinder portion 21a. This enables the lens barrel to have a simple and smaller configuration, thereby contributing to further miniaturization.

In the lens barrel 10 of this embodiment, the step portion 34g is provided in the extended portion 34b of the drive lever 34, and the step portion 23g is provided in the second straight groove 23f of the first liner 23. These step portions can prevent the extended portion 34b from being moved from the outside to the inside in the radial direction in the state where the extended portion 34b is fitted in the second straight groove 23f. Thus, the drive lever 34 (the extended portion 34b) can be surely moved in the photographic optical axis OA direction by utilizing the rotation of the first rotary cylinder 22 by the zoom motor 51. Moreover, the third lens retaining frame 31 can be operated as the retractable lens retaining frame.

In the lens barrel 10 of this embodiment, the engaging protrusion 34f is provided in the drive lever 34, and the engaging recessed portion 21e is provided in the fixed frame 21. The engaging protrusion 34f and the engaging recessed portion 21e can be engaged with each other through the contact between the one side face 34i and the engaging face 21f in the state where the drive lever 34 is supported by the drive lever guide shaft 35 and the extended portion 34b is fitted in the second straight groove 23f of the first liner 23. Thus, the drive lever 34 can be surely prevented from being rotated about the drive lever guide shaft 35. Such rotation of the drive lever 34 is caused by the engagement of the contact portion 34e thereof with the step portion 65 of the third lens retaining frame rotary base 63 rotationally biased by the compression torsion spring 36. As described above, the engaging protrusion 34f in the drive lever 34 and the engaging recessed portion 21e in the fixed frame 21 can help limit the movement of the drive lever 34 in the photographic optical axis OA direction by fitting and supporting the drive lever 34 (the extended portion 34b) in the second straight groove 23f of the first liner 23. Thus, the movement of the drive lever 34 can be surely limited. This is particularly effective since it is conceivable that the drive lever 34 (the extended portion 34b) protruding toward the image plane from the first rotary cylinder 22 (see FIG. 28) when the first rotary cylinder 22 is advanced toward the subject weakens the fitting and supporting by the second straight groove 23f.

In the lens barrel 10 of this embodiment, the settings of the inclined portion (see FIG. 9) of the cam groove 21c in the fixed cylinder portion 21a and the section between Ss1 and Ss2 of the cam groove 22e allow the third lens retaining frame 31 to move onto the photographic optical axis OA after the first rotary cylinder 22 is completely extended to the maximum extended position. Thus, the third lens retaining frame 31 and the first rotary cylinder 22 and the like can be surely prevented from interfering with each other.

In the lens barrel 10 of this embodiment, the fourth lens retaining frame 41 and the third lens retaining frame 31 can be retracted into the storing space 21Q which is located in the position lateral to the fixed cylinder portion 21a of the fixed frame 21, and located outside the maximum outside diameter of the movable lens barrel, i.e., the maximum outside diameter of the first rotary cylinder 22 in the collapsed state. Thus, the dimension in the photographic optical axis direction when the movable lens barrel is stored can be reduced without increasing the outside diameter of the fixed cylinder portion 21a.

Therefore, the lens barrel 10 (the camera 100 having the lens barrel 10) according to the present invention can be further miniaturized while enabling the retractable lens group (13) to be retracted to the outside of the inside diameter of the fixed cylinder portion 21a.

Note that although, in the above embodiment, the lens barrel 10 has been described as an example of the lens barrel according to the present invention, the present invention is not limited to the above embodiment as long as the lens barrel has the following configuration. Specifically, the lens barrel includes: multiple lens retaining frames for retaining multiple lens groups, respectively, so that the lens groups are switched between a collapsed state where at least some of the multiple lens groups are collapsed to store the lens groups and a photographing state where at least some of the lens groups are moved to the object side; a movable lens barrel for retaining the respective lens retaining frames therein; and a fixed cylinder portion for retaining the movable lens barrel therein. The lens retaining frames include a retractable lens retaining frame for movably retaining at least one of the lens groups so that all the lens groups are set in the photographing position on the same photographic optical axis in the photographing state and a retractable lens including at least one lens is retracted to a retracted position outside the inside diameter position of the fixed cylinder portion in the collapsed state. Moreover, the retractable lens retaining frame is moved between the photographing position and the retracted position by the drive force for operating the movable lens barrel relative to the fixed cylinder portion.

Moreover, while the configuration is adopted in the above embodiment in which the third lens group 13 is moved back and forth in conjunction with the movement of the movable lens barrel, i.e., the third lens retaining frame 31 is the retractable lens retaining frame, the present invention is not limited to the above embodiment but the retaining frame retaining the other lens group may be used as the retractable lens retaining frame.

Furthermore, while the cam structure includes the cam protrusion 34h of the extended portion 34b of the drive lever 34 and the cam groove 22e of the first rotary cylinder 22 in the back-and-forth drive mechanism 30 of the third lens retaining frame 31 in the above embodiment, the present invention is not limited to the above embodiment as long as the movement of the movable lens barrel (the first rotary cylinder 22 in the above embodiment) relative to the fixed cylinder portion 21a is converted into the movement along the drive lever guide shaft 35 of the drive lever 34, i.e., the movement thereof in the photographic optical axis OA direction.

While the conversion structure includes the step portion 65 of the third lens retaining frame rotary base 63 and the contact portion 34e of the insertion base portion 34a of the drive lever 34 in the back-and-forth drive mechanism 30 of the third lens retaining frame 31 in the above embodiment, the present invention is not limited to the above embodiment as long as the movement of the linearly moved drive lever 34 is converted into the rotational movement about the third group main guide shaft 32 and the linear movement along the third group main guide shaft 32.

Although the imaging apparatus of the present invention has been described above based on the embodiment, specific configurations are not limited to those in the above embodiment, but design changes, additions and the like can be made without departing from the gist of the present invention.

The lens barrel according to an embodiment of the present invention requires no retracting frame drive source only for operating the retractable lens retaining frame. This enables the lens barrel to have a smaller configuration, thereby contributing to further miniaturization.

In addition to the above configuration, the retractable lens retaining frame is configured to be moved in conjunction with the movement of the movable lens barrel relative to the fixed cylinder portion. This eliminates the need to change the basic configuration of the mechanism to operate the movable lens barrel, thereby achieving a simple configuration.

In addition to the above configuration, the drive member that can be moved by the movement of the movable lens barrel relative to the fixed cylinder portion is provided in the fixed cylinder portion so that the retractable lens retaining frame is moved between the photographing position and the retracted position. Thus, the drive member can be moved with a simple configuration by utilizing the movement of the movable lens barrel relative to the fixed cylinder portion. This enables the lens barrel to have a smaller configuration, thereby contributing to further miniaturization.

In addition to the above configuration, the drive member is configured to be movable in the photographic optical axis direction within the fixed cylinder portion, and is connected to the retractable lens retaining frame by the conversion mechanism for converting the movement of the drive member in the photographic optical axis direction into the rotational movement between the photographing position and the retracted position in the retractable lens retaining frame and the linear movement on the photographic optical axis. Thus, the retractable lens retaining frame can be moved with a simple configuration by utilizing the movement of the movable lens barrel relative to the fixed cylinder portion.

In addition to the above configuration, the drive member is connected to the movable lens barrel by the cam structure for converting the movement of the movable lens barrel relative to the fixed cylinder portion into the movement of the drive member in the photographic optical axis direction. Thus, with a simple configuration, the drive member can be moved in conjunction with the movement of the movable lens barrel relative to the fixed cylinder portion.

In addition to the above configuration, the drive member is configured to be movable in the photographic optical axis direction while bridging the inside and outside of the fixed cylinder portion. Moreover, in the drive member, one end thereof positioned inside of the fixed cylinder portion is connected to the movable lens barrel through the cam structure, and the other end thereof positioned outside of the fixed cylinder portion is connected to the retractable lens retaining frame through the conversion mechanism. Thus, with a simple configuration, the retractable lens retaining frame can be rotationally and linearly moved by moving the rotary cylinder relative to the fixed cylinder portion.

In addition to the above configuration, the movable lens barrel has the rotary cylinder rotated relative to the fixed cylinder portion, while the cam structure has the cam protrusion provided in the drive member, and the cam groove provided on the peripheral surface of the rotary cylinder so as to receive the cam protrusion. Moreover, the cam structure converts the rotation of the rotary cylinder relative to the fixed cylinder portion into the movement of the drive member in the photographic optical axis direction relative to the rotary cylinder. Thus, with a simple configuration, the drive member can be moved in conjunction with the movement of the rotary cylinder relative to the fixed cylinder portion.

In addition to the above configuration, the rotary cylinder is not only rotated relative to the fixed cylinder portion but also can be moved relative to the fixed cylinder portion forward or backward in the photographic optical axis direction. Moreover, when the rotary cylinder is moved relative to the fixed cylinder portion forward or backward in the photographic optical axis direction, the cam structure prevents the drive member from being moved relative to the fixed cylinder portion so as to fix the retractable lens retaining frame at the retracted position. Accordingly, the rotary cylinder is extended from the fixed cylinder portion in an early stage of an extending operation. This makes it possible to obtain in advance a space into which the retractable lens retaining frame is inserted on the photographic optical axis. Thus, the rotary cylinder can be collapsed into the fixed cylinder portion after the retractable lens retaining frame is retracted to the retracted position. As a result, the retractable lens retaining frame and the rotary cylinder and the like can be surely prevented from interfering with each other.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. A lens barrel device comprising:
a plurality of lens groups including at least one retractable lens group;
a plurality of lens retaining frames configured to retain the plurality of lens groups, respectively;
a movable lens barrel configured to retain the plurality of lens retaining frames therein,
a fixed cylinder portion configured to retain the movable lens barrel therein,
a zoom motor for driving the movable lens barrel relative to the fixed cylinder portion, and
a drive member provided in the fixed cylinder portion,
wherein the plurality of lens retaining frames, the movable lens barrel and the fixed cylinder portion are configured to move the plurality of lens groups between a collapsed state where the plurality of lens groups are stored with at least one portion of the plurality of lens groups collapsed and a photographing state where at least one portion of the plurality of lens groups is moved toward an object,
wherein the plurality of lens retaining frames include a retractable lens retaining frame configured to movably retain the at least one retractable lens group so as to position the plurality of lens groups in photographing positions on a single photographic optical axis in the photographing state and to retract the at least one retractable lens group to a retracted position outside an inside diameter position of the fixed cylinder portion in the collapsed state, and
wherein the zoom motor transmits a driving force to the movable lens barrel, which drives the movable lens barrel relative to the fixed cylinder portion, and wherein the movable lens barrel transmits the driving force to the drive member, and wherein the drive member transmits the driving force to the retractable lens retaining frame and thereby drives the retractable lens retaining frame to move the at least one retractable lens group between the photographing position and the retracted position, and
wherein the lens barrel device further comprises a cylindrical liner located radially within the movable lens barrel, the cylindrical liner being configured to axially slidably receive a portion of the drive member, to prevent the drive member from moving in a circumferential direction with respect to an optical axis of the lens barrel device, and to permit the drive member to slidably move relative to the cylindrical liner in an axial direction that is parallel to the optical axis of the lens barrel device, and wherein the plurality of lens retaining frames, the movable lens barrel, the fixed cylinder portion, the driver member, and the cylindrical liner are configured to move the plurality of lens groups between the collapsed state where the plurality of lens groups are stored with at least one portion of the plurality of lens groups collapsed and the photographing state where at least one portion of the plurality of lens groups is moved toward an object.

2. A lens barrel device comprising:
a plurality of lens groups including at least one retractable lens group;
a plurality of lens retaining frames configured to retain the plurality of lens groups, respectively;
a movable lens barrel configured to retain the plurality of lens retaining frames therein,
a fixed cylinder portion configured to retain the movable lens barrel therein,
a zoom motor for driving the movable lens barrel relative to the fixed cylinder portion, and
a drive member provided in the fixed cylinder portion,
wherein the plurality of lens retaining frames, the movable lens barrel and the fixed cylinder portion are configured to move the plurality of lens groups between a collapsed state where the plurality of lens groups are stored with at least one portion of the plurality of lens groups collapsed and a photographing state where at least one portion of the plurality of lens groups is moved toward an object,
wherein the plurality of lens retaining frames include a retractable lens retaining frame configured to movably retain the at least one retractable lens group so as to position the plurality of lens groups in photographing positions on a single photographic optical axis in the photographing state and to retract the at least one retractable lens group to a retracted position outside an inside diameter position of the fixed cylinder portion in the collapsed state, and
wherein the zoom motor transmits a driving force to the movable lens barrel, which drives the movable lens barrel relative to the fixed cylinder portion, and wherein the movable lens barrel transmits the driving force to the drive member, and wherein the drive member transmits the driving force to the retractable lens retaining frame and thereby drives the retractable lens retaining frame to move the at least one retractable lens group between the photographing position and the retracted position, and
wherein the drive member includes a drive lever, and wherein the drive lever includes a cam protrusion, the drive lever is movable in the photographic optical axis direction within the fixed cylinder portion, the movable lens barrel has a radially inwardly directed surface, the movable lens barrel has a cam groove located in the radially inwardly directed surface, the drive lever has a cam protrusion that is engaged with the cam groove such that rotation of the movable lens barrel causes movement of the drive lever in the photographic optical direction, and the drive lever is connected to the retractable lens retaining frame via a conversion mechanism configured to convert a movement of the drive member in the photographic optical axis direction into a rotational movement of the retractable lens retaining frame between the photographing position and the retracted position and into a linear movement of the retractable lens retaining frame on the photographic optical axis.

3. The lens barrel device according to claim 1, wherein the drive member includes a radially outwardly directed cam protrusion which is connected to the movable lens barrel via a cam structure configured to convert the movement of the movable lens barrel relative to the fixed cylinder portion into the movement of the drive member in the photographic optical axis direction.

4. The lens barrel device according to claim 3, wherein the drive member is slidably movable in the photographic optical axis direction while bridging inside and outside of the fixed cylinder portion, one end of the drive member positioned in the inside of the fixed cylinder portion is connected to the movable lens barrel via the cam protrusion and the cam structure, and another end of the drive member positioned in the outside of the fixed cylinder portion is connected to the retractable lens retaining frame via the conversion mechanism.

5. The lens barrel device according to claim 3, wherein the movable lens barrel has a rotary cylinder which is rotatable relative to the fixed cylinder portion, the cam structure includes a cam protrusion provided in the drive member, and a non-linear cam groove provided on a radially-inwardly directed surface of the rotary cylinder so as to receive the cam protrusion, and the cam structure is configured to convert the rotation of the rotary cylinder relative to the fixed cylinder portion into a movement of the drive member relative to the rotary cylinder in the photographic optical axis direction.

6. The lens barrel device according to claim 5, wherein the rotary cylinder is located between the cylindrical liner and the fixed cylinder portion, and is rotatable relative to the fixed cylinder portion and is movable relative to the fixed cylinder portion in the photographic optical axis direction forward and backward, and when the rotary cylinder is moved relative to the fixed cylinder portion in the photographic optical axis direction forward or backward, the cam structure prevents the drive member from moving relative to the fixed cylinder portion so as to fix the retractable lens retaining frame at the retracted position.

7. An imaging apparatus using the lens barrel device according to claim 1.

8. A digital camera using the lens barrel device according to claim 1.

9. A portable information terminal using the lens barrel device according to claim 1.

10. An image input apparatus using the lens barrel device according to claim 1.

11. The lens barrel device of claim 1, further comprising a single motor for providing said driving force.

12. The lens barrel device according to claim 1, wherein the retractable lens retaining frame is moved in conjunction with a movement of the movable lens barrel relative to the fixed cylinder portion.

* * * * *